United States Patent
Hashimura et al.

(10) Patent No.: US 7,789,974 B2
(45) Date of Patent: Sep. 7, 2010

(54) HIGH-STRENGTH SPRING STEEL WIRE

(75) Inventors: Masayuki Hashimura, Hokkaido (JP); Hiroshi Hagiwara, Tokyo (JP); Takanari Miyaki, Hokkaido (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/362,651

(22) PCT Filed: Dec. 20, 2001

(86) PCT No.: PCT/JP01/11216

§ 371 (c)(1), (2), (4) Date: Feb. 21, 2003

(87) PCT Pub. No.: WO02/50327

PCT Pub. Date: Jun. 27, 2002

(65) Prior Publication Data

US 2003/0201036 A1    Oct. 30, 2003

(30) Foreign Application Priority Data

| Dec. 20, 2000 | (JP) | 2000-386900 |
| Dec. 20, 2000 | (JP) | 2000-386901 |
| Dec. 20, 2000 | (JP) | 2000-386902 |
| Nov. 29, 2001 | (JP) | 2001-1364875 |

(51) Int. Cl.
  *C22C 38/18* (2006.01)
  *C22C 38/34* (2006.01)
(52) U.S. Cl. .......... 148/333; 148/320; 148/908
(58) Field of Classification Search ......... 148/333–335, 148/320, 908, 595, 580, 598; 420/104, 114, 420/117, 128
See application file for complete search history.

(56) References Cited

U.S. PATENT DOCUMENTS

| 4,810,287 A | * | 3/1989 | Saka et al. | 420/115 |
| 5,415,711 A | * | 5/1995 | Takagi et al. | 148/546 |
| 5,776,267 A | * | 7/1998 | Nanba et al. | 148/328 |

(Continued)

FOREIGN PATENT DOCUMENTS

GB    2 112 810    7/1983

(Continued)

OTHER PUBLICATIONS

Computer-generated English translation of Japanese patent 09-310145, Tomioka Katsutomo et al., Dec. 2, 1997.*

(Continued)

*Primary Examiner*—Deborah Yee
(74) *Attorney, Agent, or Firm*—Kenyon & Kenyon LLP

(57) ABSTRACT

The present invention provides a spring steel having both a high strength and a good coiling property after heat treatment, characterized by: containing, in mass, C: 0.4 to 1.2%, Si: 0.9 to 3.0%, Mn: 0.1 to 2.0%, P: 0.015% or less, S: 0.015% or less, Cr: 2.5% or less, and N: 0.001 to 0.015%, with the balance consisting of Fe and unavoidable impurities; and, in the microstructure of the steel after hot rolling, the density of globular cementite carbides 0.2 to 3 µm in circle-equivalent diameter being 0.5 piece/µm$^2$ or less and the density of globular cementite carbides over 3 µm in circle-equivalent diameter being 0.005 piece/µm$^2$ or less.

1 Claim, 7 Drawing Sheets

U.S. PATENT DOCUMENTS

| | | | |
|---|---|---|---|
| 5,897,717 A | 4/1999 | Hashimura et al. | |
| 5,904,787 A * | 5/1999 | Matsumoto et al. | 148/333 |
| 6,224,686 B1 * | 5/2001 | Aoki et al. | 148/230 |
| 6,277,220 B1 * | 8/2001 | Hamada et al. | 148/595 |
| 6,419,761 B1 * | 7/2002 | Hashimura et al. | 148/320 |
| 7,575,646 B2 * | 8/2009 | Hashimura et al. | 148/333 |

FOREIGN PATENT DOCUMENTS

| | | | |
|---|---|---|---|
| JP | 57-32353 | | 2/1982 |
| JP | 62-77441 | * | 4/1987 |
| JP | 63-128152 | | 5/1988 |
| JP | 63-227748 | * | 9/1988 |
| JP | 1-184223 | | 7/1989 |
| JP | 05-179348 | | 7/1993 |
| JP | 5-331597 | | 12/1993 |
| JP | 405331597 | * | 12/1993 |
| JP | 6-240408 | | 8/1994 |
| JP | 406240408 | * | 8/1994 |
| JP | 9-324219 | | 12/1997 |
| JP | 10-251804 | | 9/1998 |
| JP | 11-6033 | | 1/1999 |
| JP | 411006033 | * | 1/1999 |
| JP | 11-256274 | | 9/1999 |
| JP | 2000-63989 | | 2/2000 |
| JP | 2000-119805 | | 4/2000 |
| JP | 2000-219938 | * | 8/2000 |

OTHER PUBLICATIONS

English translation of Japanese patent 411006033, Yamao et al., Jan. 12, 1999.*

* cited by examiner

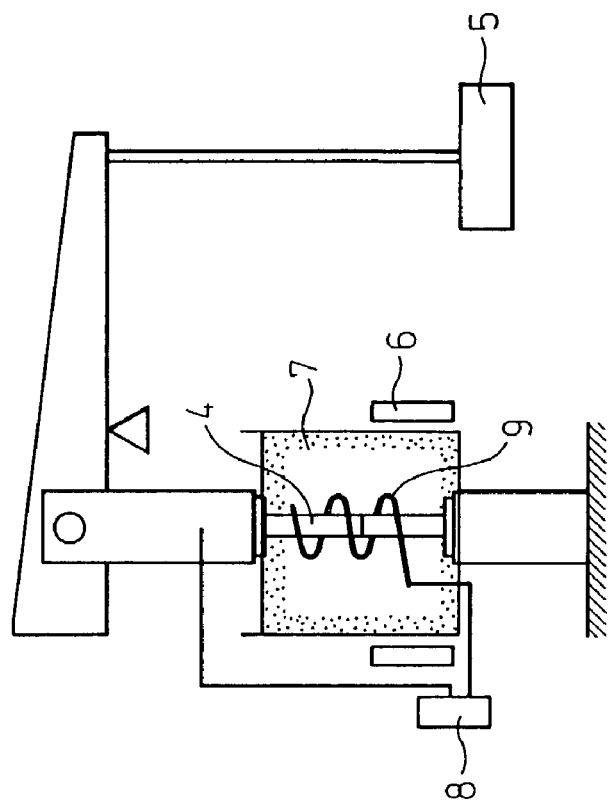
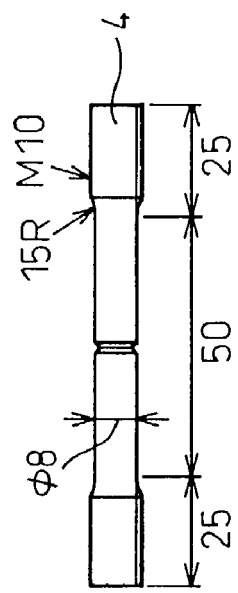
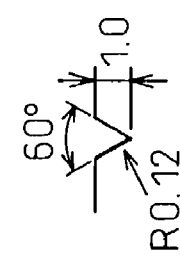

HIGH-STRENGTH SPRING STEEL WIRE

TECHNICAL FIELD

The present invention relates to a steel and a steel wire having a high strength and a high toughness after heat treatment and suitable for springs for cars and general machinery.

BACKGROUND ART

As the trend to weight reduction and higher performance of cars has grown, the strength of springs used for cars has been enhanced and, as a result, a high-strength steel having a tensile strength exceeding 1,600 MPa after heat treatment is being used for springs. Recently, a steel having a tensile strength exceeding 1,900 MPa has been used for this application.

There are two methods in manufacturing coiled springs using a steel: the hot coiling method wherein a steel is heated to the austenitizing temperature range, coiled and then quenched and tempered; and the cold coiling method wherein a high-strength steel wire quenched and tempered beforehand is coiled in a cold state. In either case, the fundamental strength of a spring is determined by quenching and tempering and, for this reason, the design of a chemical composition in consideration of the properties after quenching and tempering is an important factor in manufacturing a spring steel.

Specifically, according to Japanese Unexamined Patent Publication No. S57-32353, hardenability is improved by adding V, Nb, Mo and other elements, and setting resistance is improved by forming fine carbides precipitated during tempering and thereby restricting the movement of dislocations.

Among the aforementioned two methods in manufacturing coiled steel springs, namely, the hot coiling method wherein a steel is heated to the austenitizing temperature range, coiled and then quenched and tempered and the cold coiling method wherein a high-strength steel wire quenched and tempered beforehand is coiled in a cold state, in the case of the cold coiling method, an oil quenching and tempering treatment or a high frequency heat treatment, wherein rapid heating and rapid cooling can be applied during the production of steel wires, is employed, and it is possible to make the size of prior austenite grains in a spring steel material fine, and thus springs excellent in fracture resistance can be manufactured. In addition, as an installation such as a heating furnace or the like can be simplified in a spring manufacturing line, the cold coiling method has the advantage of reducing the equipment cost incurred by a spring manufacturer or the like. For this reason, the spring manufacturing by the cold coiling method is common.

However, as the strength of a steel wire for cold-coiled springs has increased, the steel wire tends to break during the cold coiling and it often becomes impossible to form the steel wire into the shape of a spring. Therefore, it has not always been possible to enjoy a high strength and a good workability at the same time and, for this reason, an industrially disadvantageous manufacturing method has had to be employed for the coiling work. In case of manufacturing a valve spring, though, usually, a steel wire is subjected to an on-line quenching and tempering treatment, namely an oil quenching and tempering treatment, and then coiled in a cold state, a method is employed wherein a steel wire is heated to a temperature at which it is easily deformed in order to prevent the steel wires from breaking during the coiling and, thereafter, subjecting it to a tempering treatment in order to obtain a high strength as disclosed, for instance, in Japanese Unexamined Patent Publication No. H05-179348 wherein a steel wire is heated to 900 to 1,050° C., coiled and then tempered at 425 to 550° C. However, the heating before coiling and the tempering after coiling sometimes cause a dimensional fluctuation of a product spring depending on the condition of heat treatment and/or a remarkable deterioration of treatment efficiency, and, for this reason, a spring manufactured by this method is inferior to that manufactured by the cold coiling method in terms of cost and dimensional accuracy.

In the production processes of a steel, the steel is repeatedly subjected to heating and cooling several times, for example in the processes of converter refining, casting, billet rolling and wire rod rolling. During these processes, carbide forming elements such as Cr, V, Nb and Mo contained in a steel harden the steel and, at the same time, they are likely to be retained in the steel in the form of coarse carbides. In particular, when a high strength exceeding 1,900 MPa in terms of tensile strength is expected, the addition amount of these alloying elements tends to increase and the amount of retained carbides increases accordingly. In view of the situation, Japanese Unexamined Patent Publication No. H11-6033 and some others pay attention to the carbides of Cr, V, Nb, Mo, etc. (hereinafter referred to as "alloy carbides"), and propose to regulate the grain size of the alloy carbides. However, the behavior that actually determines the strength of a steel is not the behavior of the fine carbides of these elements, but the behavior of carbides mainly composed of cementite, namely iron carbides, (hereinafter referred to as "cementite carbides"), and, therefore, the control of the very cementite is important for a spring steel.

With regard to the grain size of alloy carbides, proposals that pay attention to the average grain size of the carbides of Nb and V are advanced, for example, in Japanese Unexamined Patent Publication No. H10-251804. However, in this prior art, there is a description of apprehending that an abnormal structure is generated by cooling water during rolling (paragraph 0015), and the prior art substantially recommends dry rolling.

However, dry rolling, which is distinctly different from normal rolling, is an unstable operation in industrial practices and the prior art suggests that, even when the average grain size is controlled by dry rolling, if unevenness occurs in the peripheral matrix structure, rolling troubles are caused, and that, as a consequence, the control alone of the average grain size of the alloy carbides such as the carbides of V and Nb is not sufficient, industrially.

DISCLOSURE OF THE INVENTION

The object of the present invention is to provide a spring steel and a steel wire, for springs, producable industrially and capable of securing the strength and coiling property suitable for a spring after quenching and tempering.

The present inventors have developed a spring steel and a steel wire for springs having both a high strength and a good coiling property after quenching and tempering by making the size of carbides, and cementite in particular, in a steel fine, which size has not been an object of special attention in conventional spring steel technologies. That is, the gist of the present invention is the following spring steel and steel wire for springs.

(1) A high-strength spring steel and a steel wire for springs characterized by: containing, in mass,
C: 0.4 to 1.2%,
Si: 0.9 to 3.0%,
Mn: 0.1 to 2.0%,
P: 0.015% or less,
S: 0.015% or less, Cr: 2.5% or less, and
N: 0.001 to 0.015%, with the balance consisting of Fe and unavoidable impurities; and, in the microstructure of the steel after hot rolling, the density of globular cementite carbides 0.2 to 3 μm in circle-equivalent diameter being 0.5 piece/μm² or less and the density of globular cementite carbides over 3 μm in circle-equivalent diameter being 0.005 piece/μm² or less.

(2) A high-strength spring steel and a steel wire for springs according to the item (1), characterized by further containing, in mass, one or more of;
W: 0.05 to 1.0%,
Co: 0.05 to 5.0%,
Ti: 0.005 to 0.1%,
Mo: 0.05 to 1.0%,
V: 0.05 to 0.7%,
Nb: 0.01 to 0.05%,
B: 0.0005 to 0.006%,
Ni: 0.05 to 5.0%,
Cu: 0.05 to 0.5%, and
Mg: 0.0002 to 0.01%.

(3) A high-strength spring steel characterized by: containing, in mass,
C: 0.4 to 0.8%,
Si: 0.9 to 3.0%,
Mn: 0.1 to 2.0%,
P: 0.015% or less,
S: 0.015% or less,
Cr: 1.5% or less, and
N: 0.001 to 0.007%, with the balance consisting of Fe and unavoidable impurities; and, in the microstructure of the steel after hot rolling, the density of globular cementite carbides 0.2 to 3 μm in circle-equivalent diameter being 0.5 piece/μm² or less and the density of globular cementite carbides over 3 μm in circle-equivalent diameter being 0.005 piece/μm² or less.

(4) A high-strength spring steel according to the item (3), characterized by further containing, in mass, one or more of;
W: 0.05 to 1.0%,
Co: 0.05 to 5.0%,
Ti: 0.005 to 0.1%,
Mo: 0.05 to 1.0%,
V: 0.05 to 0.7%,
Nb: 0.01 to 0.05%,
B: 0.0005 to 0.006%,
Ni: 0.05 to 5.0%,
Cu: 0.05 to 0.5%, and
Mg: 0.0002 to 0.01%.

(5) A high-strength spring steel characterized by: containing, in mass,
C: 0.8 to 1.0%,
Si: 0.9 to 3.0%,
Mn: 0.1 to 2.0%,
P: 0.015% or less,
S: 0.015% or less,
Cr: 0.5% or less,
N: 0.001 to 0.007%, and further one or both of W: 0.05 to 1.0% and Co: 0.05 to 5.0%, with the balance consisting of Fe and unavoidable impurities; and, in the microstructure of the steel after hot rolling, the density of globular cementite carbides 0.2 to 3 μm in circle-equivalent diameter being 0.5 piece/μm² or less and the density of globular cementite carbides over 3 μm in circle-equivalent diameter being 0.005 piece/μm² or less.

(6) A high-strength spring steel according to the item (5), characterized by further containing, in mass, one or more of;
Ti: 0.005 to 0.1%,
Mo: 0.05 to 1.0%,
V: 0.05 to 0.7%,
Nb: 0.01 to 0.05%,
B: 0.0005 to 0.006%,
Ni: 0.05 to 5.0%,
Cu: 0.05 to 0.5%, and
Mg: 0.0002 to 0.01%.

(7) A high-strength spring steel characterized by containing, in mass,
C: 0.8 to 1.2%,
Si: 0.9 to 3.0%,
Mn: 0.1 to 2.0%,
P: 0.015% or less,
S: 0.015% or less,
Cr: 0.5 to 1.5%,
N: 0.001 to 0.015%, and
W: 0.05 to 1.0%, with the balance consisting of Fe and unavoidable impurities.

(8) A high-strength spring steel according to the item (7), characterized by further containing, in mass, one or more of;
Ti: 0.005 to 0.1%,
Mo: 0.05 to 1.0%,
V: 0.05 to 0.7%,
Nb: 0.01 to 0.05%,
B: 0.0005 to 0.006%,
Ni: 0.05 to 5.0%,
Cu: 0.05 to 0.5%, and
Mg: 0.0002 to 0.01%.

(9) A high-strength spring steel according to the item (7) or (8), characterized by, in the microstructure of the steel after hot rolling, the density of globular cementite carbides 0.2 to 3 μm in circle-equivalent diameter being 0.5 piece/μm² or less and the density of globular cementite carbides over 3 μm in circle-equivalent diameter being 0.005 piece/μm² or less.

(10) A high-strength heat-treated steel wire for springs characterized by: containing, in mass,
C: 0.4 to 1.0%,
Si: 0.9 to 3.0%,
Mn: 0.1 to 2.0%,
P: 0.015% or less,
S: 0.015% or less,
Cr: 2.5% or less, and
N: 0.001 to 0.007%, with the balance consisting of Fe and unavoidable impurities; the tensile strength (TS) being 1,900 MPa or more; the percentage of the area occupied by the globular cementite carbides 0.2 μm or more in circle-equivalent diameter on a microscopic observation plane being 7% or less; the density of the globular cementite carbides 0.2 μm or more in circle-equivalent diameter being 1 piece/μm² or less; the density of the globular cementite carbides over 3 μm in circle-equivalent diameter being 0.001 piece/μm² or less; the grain size number of prior austenite being 10 or higher; the maximum grain size of carbides being 15 μm or less; and the grain size of oxides being 15 μm or less.

(11) A high-strength heat-treated steel wire for springs according to the item (10), characterized by further containing, in mass, one or more of;
W: 0.05 to 1.0%,
Co: 0.05 to 5.0%, Ti: 0.005 to 0.1%,
Mo: 0.05 to 1.0%,
V: 0.05 to 0.7%,
Nb: 0.01 to 0.05%,
B: 0.0005 to 0.006%,
Ni: 0.05 to 5.0%,
Cu: 0.05 to 0.5%, and
Mg: 0.0002 to 0.01%.

BRIEF DESCRIPTION OF THE DRAWINGS

FIG. 2 shows the results of analyzing globular alloy carbides in spring steels according to the present invention by EDX using an SEM.

FIG. 3 shows the results of analyzing globular cementite carbides in spring steels according to the present invention by EDX using an SEM.

FIGS. 5(a) and 5(b) are illustrations showing the delayed fracture test method.

BEST MODE FOR CARRYING OUT THE INVENTION

Figure 1:
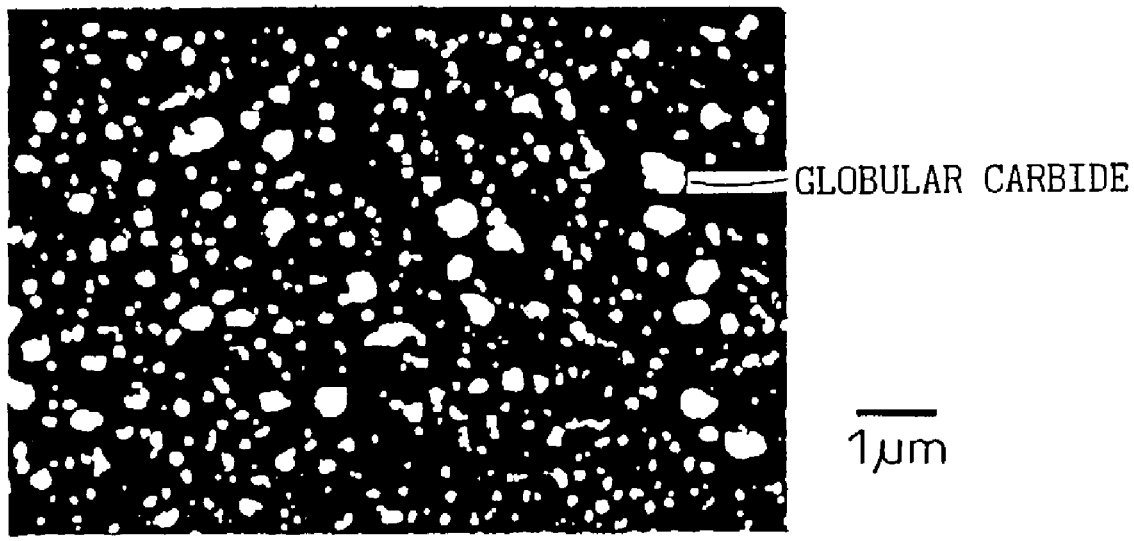
FIG. 1 is a micrograph showing the structure of a quenched and tempered spring steel.
Figure 2A:
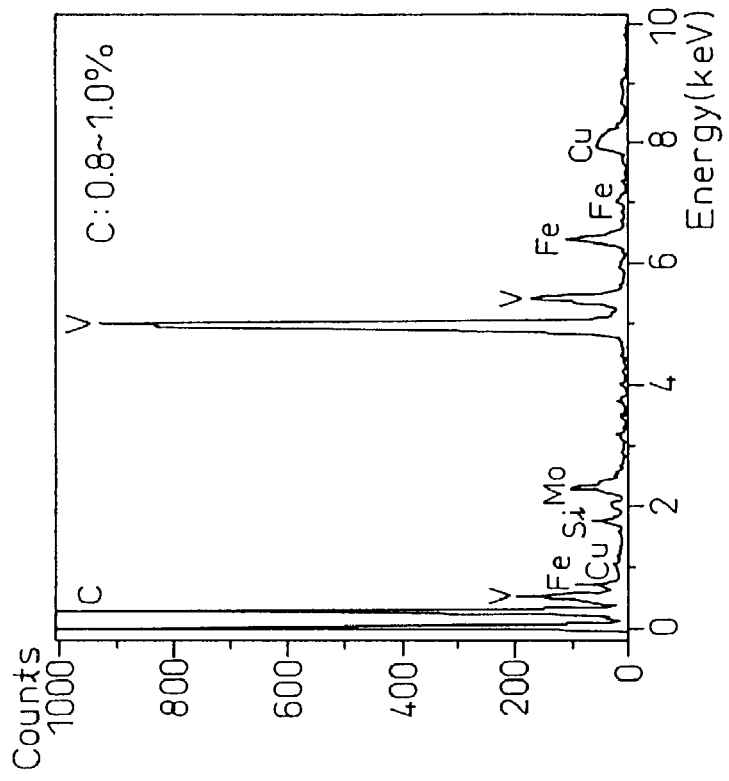
FIG. 2(a) shows the result in the case where a steel contains C of 0.4 to 0.8%.
Figure 2B:
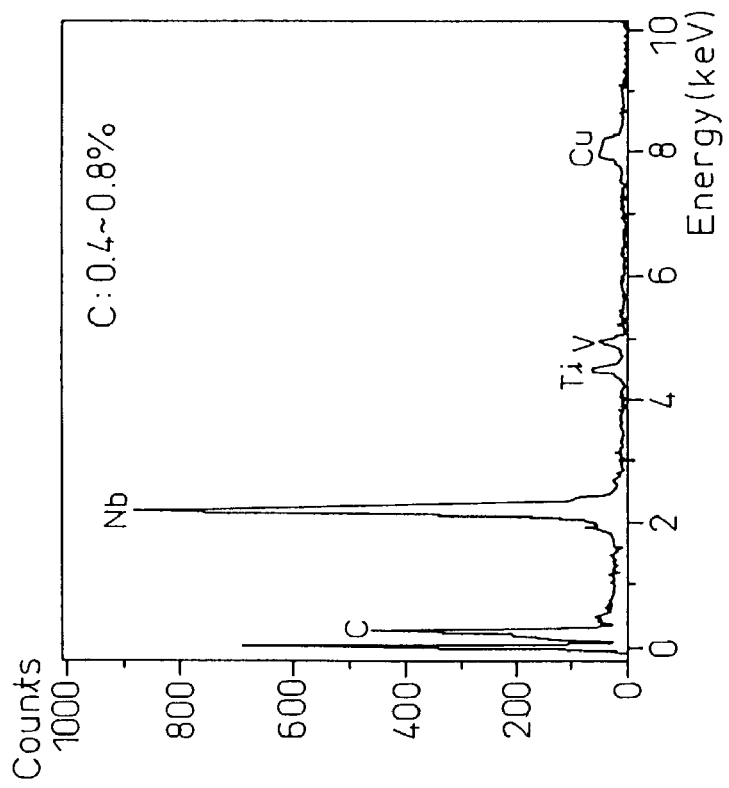
FIG. 2(b) the case where a steel contains C of 0.8 to 1.0%.
Figure 2D:
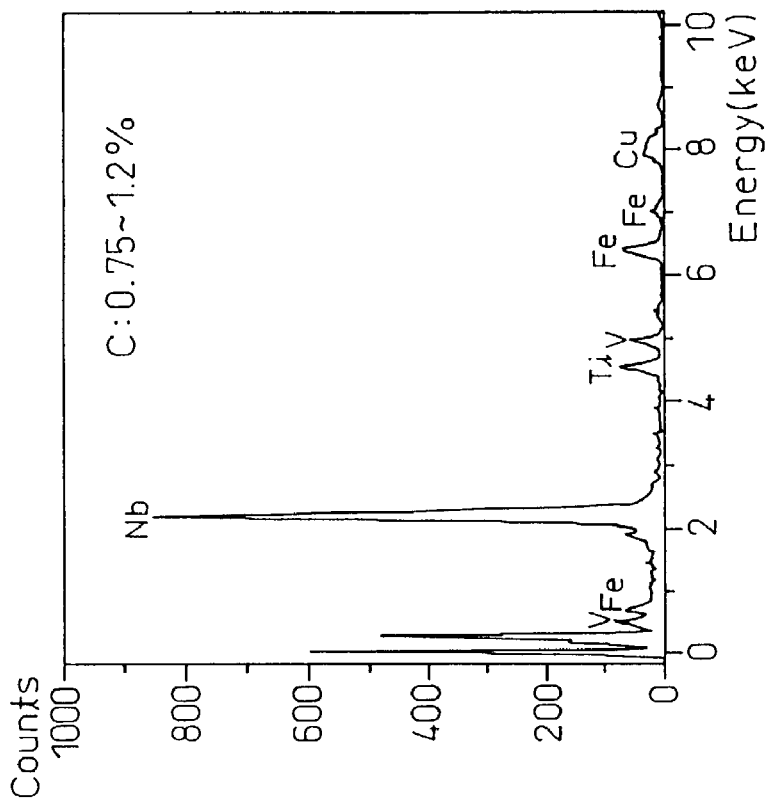
FIG. 2(d) the case where a steel contains C of 0.75 to 1.2%.
Figure 2C:
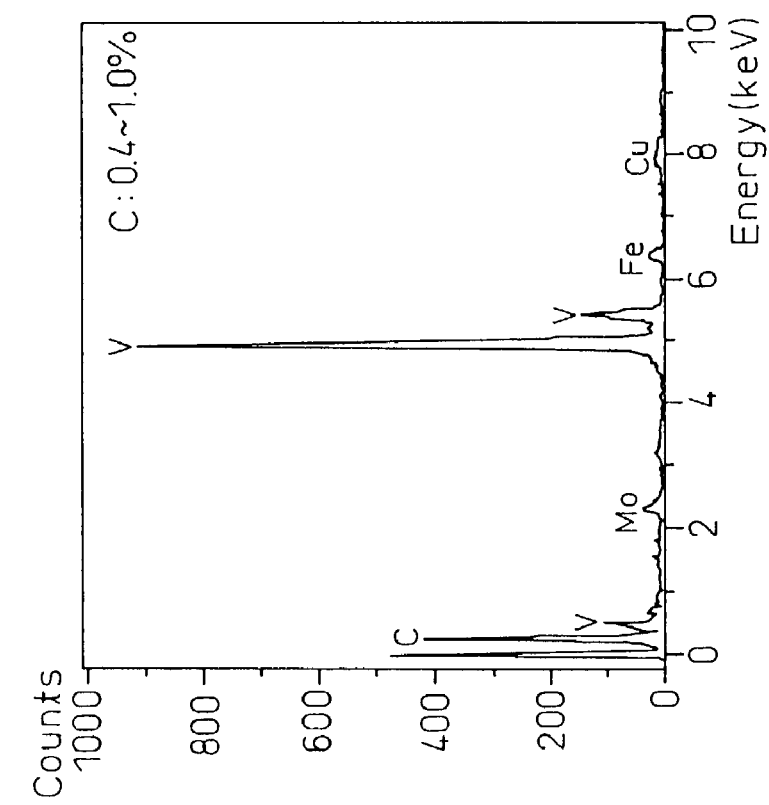
FIG. 2(c) the case where a steel contains C of 0.4 to 1.0%.
Figure 3A:
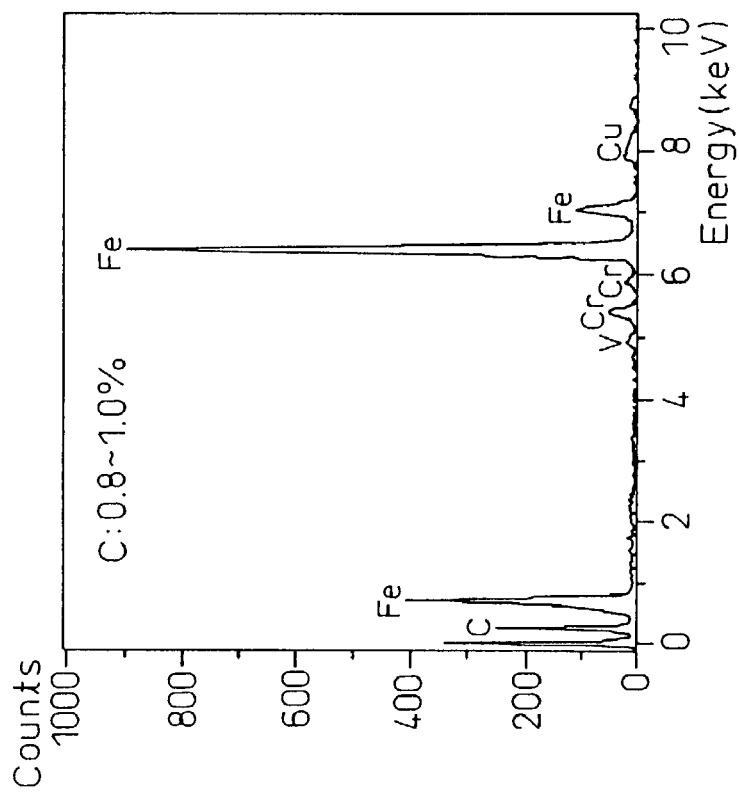
FIG. 3(a) shows the result in the case where a steel contains C of 0.4 to 0.8%.
Figure 3B:
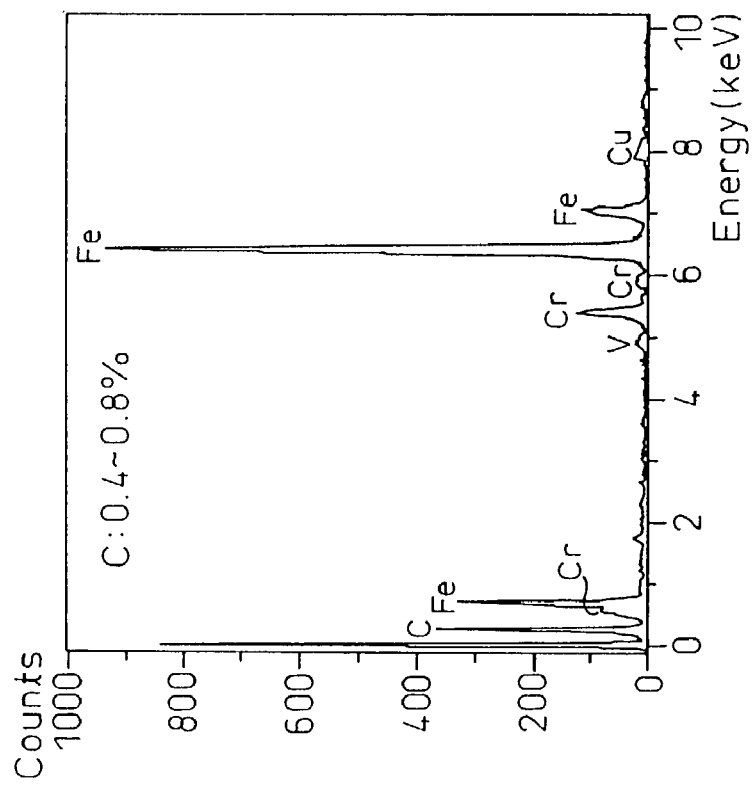
FIG. 3(b) the case where a steel contains C of 0.8 to 1.0%.
Figure 3D:
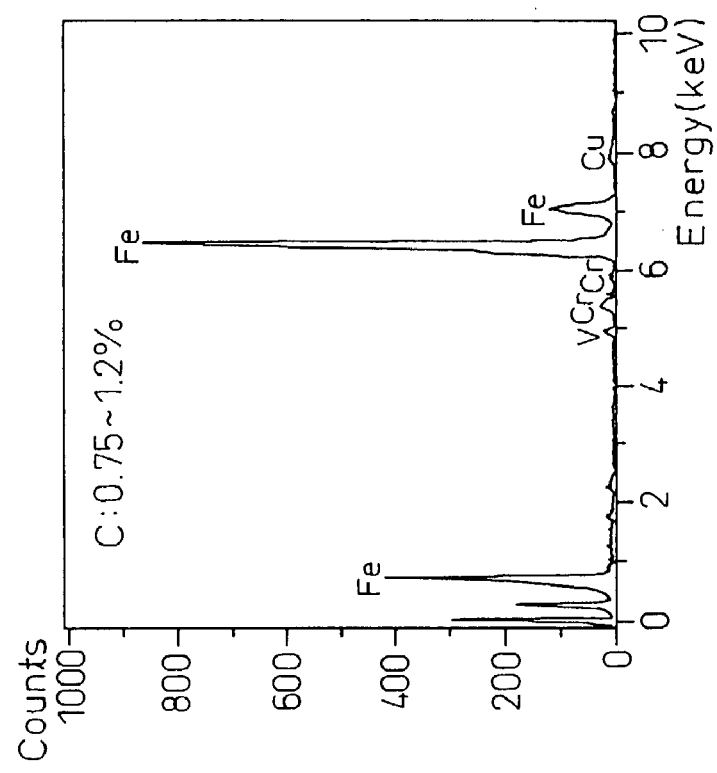
FIG. 3(d) the case where a steel contains C of 0.75 to 1.2%.
Figure 3C:
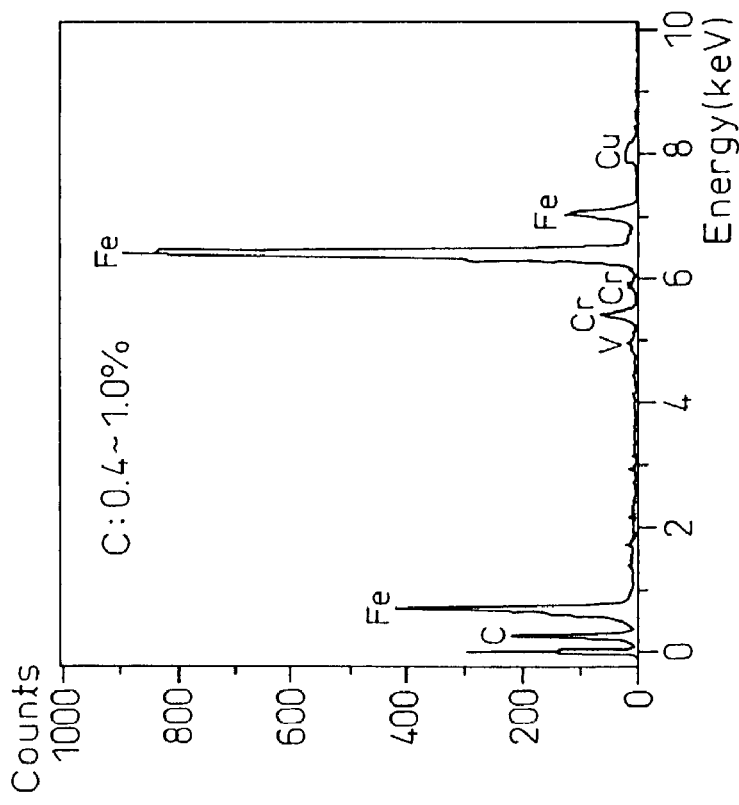
FIG. 3(c) the case where a steel contains C of 0.4 to 1.0%.

The present invention provides a spring steel and a heat-treated steel wire for springs wherein a high strength is secured by specifying chemical components appropriately and a good coiling performance during the production of springs is secured by controlling the shape of carbides in the steel by means of heat treatment.

In the first place, the reasons for specifying the chemical components of a steel are explained.

C is an element which exerts a great influence on the fundamental strength of a steel material and, as such, the range of its content is set at 0.4 to 1.2% for obtaining a sufficient strength. If the content of C is below 0.4%, a sufficient strength is not realized and, to make up for the insufficient strength, the contents of the other alloying elements must be increased. If it exceeds 1.2%, coarse cementite grains precipitate in a great amount after normal rolling and, as a result, toughness is remarkably deteriorated. The deterioration of toughness deteriorates the coiling property at the same time and, in addition, leads to the problems of requiring a higher heat treatment temperature in the industrial production of a spring steel and making a high frequency heat treatment difficult.

Further, in consideration of the relation with the other alloying elements and the methods of heat treatment such as oil quenching and tempering and high frequency heat treatment, it is desirable to control the content of C within the range at 0.4 to 1.2%.

Si is an element indispensable for securing the strength, hardness and settling resistance of a spring and, when its content is below 0.9%, a required strength and settling resistance cannot be obtained and, for this reason, the lower limit of its content is set at 0.9%. Besides the above, Si has the effects of spheroidizing the precipitates of carbides at grain boundaries and making the precipitates fine and thus has the effect of reducing the percentage of the area occupied by intergranular precipitates in the grain boundaries. However, its addition in a great amount not only hardens a steel material but also embrittles it. For this reason, in order to avoid the embrittlement after quenching and tempering, the upper limit of Si content is set at 3.0%.

Mn enhances hardenability and hardens the matrix of a steel. It also makes S harmless by fixing S in a steel in the form of MnS. With regard to the behavior of carbides, which is one of the points of special importance in the present invention, Mn is also an element capable of securing strength without forming carbides. For this reason, it is necessary to add Mn by 0.1% or more for fixing S in the form of MnS and, for securing strength, it is desirable to add Mn by 0.5% or more. The upper limit of its content is set at 2.0% for preventing the embrittlement caused by Mn.

Cr is an element effective for improving hardenability and temper softening resistance. When the fatigue strength of a spring is enhanced by surface hardening in nitriding treatment, as the Cr content increases, the hardened layer becomes thicker in a short nitriding treatment time and the maximum hardness is also likely to be higher. For this reason, it is desirable to add Cr when nitriding is employed in the manufacturing process. When the addition amount of Cr is large, however, the manufacturing cost increases and, besides, cementite which appears after quenching and tempering is made coarse and, as a consequence, a produced steel wire tends to be brittle and prone to break during coiling. As Cr dissolves in cementite precipitating after rolling, in particular, the cementite is stabilized and is likely to be insoluble during heating for quenching. This fact exerts a significant influence on an oil-tempered steel wire, a high frequency heat-treated material and so on. Therefore, the upper limit of Cr content is set at 2.5%, the amount beyond which cementite is rendered hardly soluble during the heating for quenching in a spring manufacturing process and the heat treatment during the production of a spring or a steel wire for springs becomes very difficult.

It is preferable to control the addition amount of Cr to 1.5% or less, but the amount should be controlled in consideration of the relations with the other addition elements and a method of heat treatment such as an oil quenching and tempering treatment or a high frequency heat treatment. That is, when C amount is 0.8% or more, it is desirable to control the Cr content to 0.5% or less and/or add simultaneously the elements such as W and Co, which are capable of suppressing the formation of globular cementite carbides.

N combines with V and Nb to form nitrides and, at the same time, facilitates the formation of carbonitrides. As the carbonitrides serve as the pinning grains to suppress the growth of austenite grains during quenching, N is effective also for making the size of austenite grains fine. For these purposes, N is added by 0.001% or more. An excessive amount of N, on the other hand, causes the coarsening of nitrides, carbonitrides generated by making the nitrides work as nuclei, and carbides. For this reason, the upper limit of the content is set at 0.007%.

P makes steel hard but, on the other hand, it forms segregation and embrittles a material. In particular, P segregated at austenite grain boundaries lowers impact values and causes delayed cracking and the like by the penetration of hydrogen, and therefore the smaller the content, the better. For the above reasons, the upper limit of the content is set at 0.015%, the amount beyond which the embrittlement becomes conspicuous.

S, like P, also embrittles a steel when contained in a steel. Its adverse effect is reduced to the utmost by adding Mn but, as MnS also takes the form of inclusions, a fracture property is deteriorated. In a high-strength steel in particular, only a small amount of MnS may cause fracture and, for this reason, it is desirable to make its content as small as possible. Therefore, its upper limit is set at 0.015%, the amount beyond which the adverse effect becomes significant.

W improves hardenability and, at the same time, enhances strength by forming carbides in steel. W is particularly important because it is capable of suppressing the coarsening of cementite and other alloy carbides. When the addition amount is below 0.05%, no tangible effect is obtained but, when it exceeds 1.0%, coarse carbides form and, adversely, ductility and other mechanical properties may be deteriorated. For this reason, the content is limited to the range at 0.05 to 1.0%.

Co lowers hardenability but it has an effect of securing strength at a high temperature. Besides, it is effective for suppressing the formation of carbides and, in particular, it suppresses the formation of coarse carbides, which constitutes one of the main issues of the present invention. When the content is below 0.05%, the effect is too small but, when it exceeds 5.0%, the effect is saturated. For this reason, Co content is limited to the range at 0.05 to 5.0%.

Both W and Co have the effect of making the cementite carbides fine, although their mechanisms, in a steel, are different. Therefore, when a steel contains a great amount of C as in the case of the present invention, they are effective for making cementite grains fine and easily soluble in the steel. For this reason, when a high-C steel is produced, it is desirable to add W and/or Co.

Ti, Mo, V and Nb precipitate in a steel in the forms of nitrides, carbides and carbonitrides. Thus, when one or more of these elements are added, the precipitates form and temper softening resistance is obtained, which fact makes it possible to secure a high strength without softening even when a steel is subjected to a heat treatment such as stress relief annealing in a high temperature tempering process or nitriding. As this suppresses the deterioration of the internal hardness of a spring after nitriding and/or facilitates hot setting and stress relief annealing, the fatigue property of the spring finally produced is improved. However, if the addition amount of Ti, Mo, V and Nb is too high, the size of their precipitates becomes too large, the precipitates combine with carbon in a steel and coarse carbides are formed. This decreases the amount of C to contribute to the strengthening of a steel wire and, as a consequence, the strength proportionate to the addition amount of C is not obtained. What is more, as the coarse carbides act as the sites of stress concentration, a steel wire easily deforms or breaks during coiling work.

Ti often takes the form of precipitates already in molten steel because the precipitation temperature of Ti nitrides is high. In addition, Ti is also used for fixing N in a steel because the bonding strength with N is strong. When B is added to a steel, it is necessary to add Ti in the amount enough for fixing N for preventing B from forming BN. Thus, it is desirable to fix N using Ti. The lower limit of the addition amount of Ti is set at 0.005% because this is the minimum required addition amount for making austenite grains fine, and the upper limit is set at 0.1% because this is the maximum amount in which the size of the precipitates does not adversely affect the fracture property.

Mo, when added at 0.05 to 1.0%, improves hardenability, gives temper softening resistance to a steel, and makes it possible to raise the tempering temperature when steel strength is controlled. This is advantageous for lowering the percentage of the area occupied by intergranular carbides in the grain boundaries. In other words, Mo is effective in spheroidizing intergranular carbides, which precipitate in the shape of films, through tempering at a high temperature and thus decreasing the percentage of the area occupied by intergranular carbides in the grain boundaries. Besides, Mo forms Mo carbides in a steel, separately from cementite. In particular, because the precipitation temperature of Mo is lower than that of V and other elements, Mo has an effect of suppressing the coarsening of carbides. When the addition amount of Mo is below 0.05%, said effects do not show up, but the effects are saturated when Mo is added in excess of 1.0%.

V is useful for suppressing the coarsening of austenite grains by the formation of nitrides, carbides and carbonitrides and, in addition, for hardening a steel wire at a tempering temperature as well as hardening the surface layer during nitriding. Little effect is obtained when the addition amount of V is below 0.05% and, when it exceeds 0.7%, coarse insoluble inclusions are formed and toughness is deteriorated.

Likewise, Nb is useful for suppressing the coarsening of austenite grains by the formation of nitrides, carbides and carbonitrides and, in addition, for hardening a steel wire at a tempering temperature as well as hardening the surface layer during nitriding. As Nb forms fine carbides at a temperature higher than the temperature at which V, Mo and so on form fine carbides, the effect of fining the size of austenite grains during the manufacturing of a heat-treated steel wire is large even with a small addition amount and, thus, Nb is a very useful element. When the content is below 0.01%, little tangible effect is obtained and, when the content exceeds 0.05%, coarse insoluble inclusions are formed and toughness is deteriorated. For this reason, the range of the content is set at 0.01 to 0.05%.

B is known as an element to enhance hardenability. It is also effective for cleaning austenite grain boundaries. This means that the elements such as P and S, which precipitate at grain boundaries and lower toughness, are rendered harmless by the addition of B and, thus, the fracture property is improved. If B combines with N to form BN, however, the above effect is lost. The lower limit of the addition amount of B is set at 0.0005%, the amount at which the effect becomes obvious, and the upper limit at 0.006%, the amount beyond which the effect is saturated.

Ni improves hardenability and enhances strength stably through a heat treatment. It also improves the coiling property by enhancing the ductility of a steel matrix. In addition, it increases the corrosion resistance of a spring and, thus, it is effective for a spring used in a corrosive environment. When its addition amount is below 0.05%, the effect of improving strength and ductility is not obtained but, when its content exceeds 5.0%, the effect is saturated and such an addition of Ni is disadvantageous in terms of manufacturing costs and so on.

As for Cu, its addition prevents decarburization. As the existence of a decarburized layer decreases the fatigue life of a spring after it is manufactured, efforts are exerted to make the decarburized layer as small as possible and, when the decarburized layer is thick, the surface layer is removed by peeling work. Cu also has an effect of improving corrosion resistance, like Ni. Therefore, by suppressing the formation of a decarburized layer, the fatigue life of a spring is improved and the peeling process can be eliminated. The effects of Cu in suppressing decarburization and improving corrosion resistance manifest themselves when Cu is added by 0.05% or more. When Cu content exceeds 0.5%, even if Ni is added as explained later, a steel is embrittled and rolling defects are likely to occur. For these reasons, the lower limit of Cu content is set at 0.05%, and the upper limit at 0.5%. While it is little likely that the mechanical properties of a steel at room temperature are adversely affected by the addition of Cu, when Cu is added in excess of 0.3%, hot ductility is deteriorated and, as a result, cracks may develop at the surface of a billet during rolling. As a countermeasure, it is desirable to control the addition amount of Ni, which prevents cracks during rolling, in relation to the addition amount of Cu so as to satisfy the expression [Cu %]<[Ni %].

Mg is an oxide forming element and, as such, forms oxides in molten steel. The temperature range in which the oxides of Mg are formed is higher than that of MnS and, therefore, when MnS is formed, the Mg oxides already exist in molten steel. Therefore, the Mg oxides can be used as precipitation nuclei of MnS and the distribution of MnS can be controlled using this mechanism. That is to say, as Mg oxides are dispersed in molten steel in finer grains than the oxides of Si and Al commonly seen in a conventional steel, MnS formed by making Mg oxides work as precipitation nuclei is dispersed in the steel in fine grains. As a consequence, the distribution of MnS varies depending on whether Mg is contained or not even though S content is identical and, when Mg is added, the grain size of MnS becomes finer. A sufficient effect is obtained with only a small amount of Mg: MnS grains are made fine when 0.0002% or more of Mg is added. However, industrially, 0.01% is the upper limit of its addition because Mg of 0.01% or more is hard to retain in molten steel. Thus, the range of the addition amount of Mg is set at 0.0002 to 0.01%. It is desirable to add Mg whenever possible, because Mg is effective in improving corrosion resistance and delayed fracture and preventing rolling cracks and so on by virtue of the MnS distribution and the like. A preferable range of the addition amount of Mg is at 0.0005 to 0.01%.

Issues related to the production of a spring steel according to the present invention envisaging a higher strength than conventional steels are explained hereafter. Springs are strengthened through quenching and tempering, but steels of conventional chemical compositions are embrittled during the process and are not suitable for actual use. For this reason, the temperature of tempering has to be lowered, or otherwise, when springs are manufactured by the cold coiling method, steel wires break during the coiling work after the quenching and tempering. The amount of C is increased to some extent and/or alloying elements such as Cr and V are added as common countermeasures against the above problems. However, when the addition amount of the alloying elements is increased, segregation occurs and, as the melting point is locally lowered at the portions where they are densely concentrated, cracks are likely to develop there. This is considered to be one of the causes of the rolling defects.

Next, carbides, which constitute one of the points of special note in the present invention, are explained. When the performance of a spring is examined, the form of carbides in a steel is an important factor. Here, the carbides in a steel mean cementite seen in a steel after heat treatment, carbides formed by the solution of alloying elements in cementite (hereinafter collectively referred to as "cementite") and alloy carbides. The carbides can be observed by polishing to a mirror finish and etching a sectional plane of a steel or a steel wire.

FIG. 1 shows a micrograph of a typical example of a structure formed by quenching and tempering. Two kinds of carbides, i.e., carbides precipitated in a pearlite shape or a tabular shape and globular carbides, are seen in the steel in FIG. 1. Spring steels are cast, rolled into billets, cooled once to the room temperature and then rolled into wire rods of the sizes required by purchasers. The spring steels are further quenched and tempered and, in this process, while the cementite in the tabular or pearlite shape easily dissolves into steel, the carbides which are spheroidized and stabilized do not easily dissolve during the subsequent quenching and tempering process. For this reason, the strength proportionate to the addition amount of C may not be obtained and/or the ductility for coiling work may be lowered. The globular carbides also cause the rolling defects during the rolling of a wire rod.

The retained insoluble carbides do not in the least contribute to the strength and toughness obtainable through quenching and tempering, and they not only waste the added C by fixing C in a steel but also act as the sites of stress concentration, and therefore they cause the deterioration of the mechanical properties of a steel wire. The globular carbides are products formed by growing, globularly, as they failed to dissolve in a steel during reheating (such as heating during the rolling of wire rods, spring manufacturing and so on) after cooling. Therefore, it is preferable to make the amount of globular carbides as small as possible even immediately after the rolling of a wire rod. The globular carbides further grow and coarsen particularly during the heat treatment after rolling such as oil quenching and tempering treatment. From this viewpoint, even the carbides 3 μm or less in circle-equivalent diameter, generally considered to be harmless, are highly likely to cause problems. The present inventors discovered that cementite composed mainly of Fe and C, which had not thitherto attracted attention, was not an exception in this respect. These coarse and insoluble carbides not only adversely affect the manufacturing of a spring but also cause defects during rolling.

The cementite carbides also include the substances wherein alloying elements such as Cr, Mo, etc. are dissolved in cementite; generally speaking, the cementite containing these elements in a solute state is stable and hardly dissolved in steel. The detection of the cementite is carried out by analyzing the carbides which appear after etching, and, in this case, carbides mainly composed of Fe and C are detected and dissolved alloying elements are also detected, sometimes. Hereunder, this type of carbides mainly composed of Fe and C is referred to as cementite carbides and, in particular, when it takes a globular shape, as globular cementite carbides.

FIGS. 2(a) to 2(d) show examples of the carbides analyzed using an EDX attached to an SEM. Similar analysis results can be obtained by the replica method using a transmission electron microscope. Prior inventions have paid attention only to the carbides of the alloying elements such as V and Nb added for obtaining a high strength, and this type of carbides is characterized by having a very low Fe peak in the carbides as exemplified in FIG. 2(a). In contrast, the present invention has paid attention not only to the precipitation of the carbides of alloying elements noticed in the prior inventions but also to that of the globular cementite carbides 3 μm or less in circle-equivalent diameter composed of $Fe_3C$ and $Fe_3C$ wherein a small amount of alloying elements is dissolved, as shown in FIGS. 3(a) to 3(d). When it is attempted to achieve both a higher strength and a better workability than a conventional steel wire as in the case of the present invention, if the amount of the globular cementite carbides 3 μm or less in circle-equivalent diameter is large, workability is significantly deteriorated.

When a steel is coiled after being quenched and tempered, the globular cementite carbides affect the coiling property of the steel, namely the bend ability of the steel until fracture occurs. Attention has hitherto been paid to the view that, when not only C but also alloying elements such as Cr and V are added in a large amount for obtaining a high strength, coarse globular carbides are generated abundantly and cause the deterioration of coiling property and the generation of rolling defects. However, it is the so-called globular cementite carbides composed of $Fe_3C$ and $Fe_3C$ wherein a small amount of alloying elements is dissolved, as shown in FIGS. 3(a) to 3(d), that affect the rolling defects and the coiling property, and, when the globular cementite carbides exist in a great amount and/or they grow into coarse grains, they promote the occurrence of cracks during rolling and, at the same time, deteriorate the mechanical properties of a heat-treated steel wire and their coiling property in particular.

The globular carbides can be observed by polishing in mirror finish and etching a sectional plane of a sample using picral or the like. For the observation of the object carbides, namely the globular cementite carbides 0.2 to 3 μm in circle-equivalent diameter, and the detailed evaluation of their size and so on, it is necessary to observe them under a high magnification of 3,000 or more using a scanning electron microscope. It was believed that fine carbides in a steel were indispensable for securing the strength and temper softening resistance of a steel, but the present inventors discovered that the grain size effective for the purposes was 0.1 μm or less in terms of circle-equivalent diameter and that, when their circle-equivalent diameter exceeded 1 μm, they would not contribute to strengthening a steel and making the austenite grains fine any more, but would merely deteriorate the deformation property.

In addition, when the grain size (circle-equivalent diameter) of globular cementite carbides is 3 μm or less, not only their size but also their number constitutes a significant factor in the present invention. Therefore, in consideration of the aspects of their size and number, the present inventors found out that, even if the circle-equivalent diameter was as small as from 0.2 to 3 μm, when their density on a microscopic observation plane was so large as to exceed 0.5 piece/$μm^2$, the coiling property deteriorated significantly.

What is more, when the size of the carbides exceeds 3 μm, the influence of the size becomes larger and, as a consequence, when their density on a microscopic observation plane exceeds 0.005 piece/$μm^2$, the coiling property deteriorates remarkably.

If such carbides remain immediately after hot rolling, they do not easily dissolve in a steel during various heat treatments in the subsequent processes from wire drawing to spring manufacturing and, for this reason, it is desirable that they do not remain insoluble immediately after the wire rod rolling, too. Based on the above, the present invention stipulates that, in the microstructure of a steel after rolling, the density of the globular cementite carbides 0.2 to 3 μm in circle-equivalent diameter is 0.5 piece/$μm^2$ or less and the density of the globular cementite carbides over 3 μm in circle-equivalent diameter is 0.005 piece/$μm^2$ or less.

What is more, when the percentage of the area occupied by the globular cementite carbides on a microscopic observation plane exceeds 7%, regardless of their size, the coiling property is so heavily deteriorated that the coiling work is rendered impossible. For this reason, the present invention stipulates that the percentage of the area occupied by them on a microscopic observation plane is 7% or less.

On the other hand, in addition to carbides, the size of prior austenite grains has a significant influence on the fundamental properties of a steel wire; the smaller the prior austenite grain size is, the better the fatigue property and coiling property become. However, no matter how small a prior austenite grain size is, if carbides are contained in a steel beyond the upper limit specified in the present invention, the above effect is impaired. Generally speaking, in order to make a prior austenite grain size small, it is effective to lower the heating temperature but, adversely, this increases carbides. Therefore, it is important to produce a steel wire wherein a carbide amount and a prior austenite grain size are well balanced with each other. Here, if a prior austenite grain size number is below 10, even when the carbides are within the range specified above, a sufficient fatigue property is not obtained. For this reason, the present invention stipulates that the prior austenite grain size number must be 10 or higher.

In addition, when both the maximum grain size of all the carbides, including the carbides of alloying elements and so on, and the maximum grain size of oxides exceed 15 μm, the fatigue property is deteriorated. For this reason, they are limited in the present invention by setting their respective upper limits at 15 μm.

It has to be noted that, while wire rods are produced through the processes of continuous casting, billet rolling and wire rod rolling, or the processes of continuous casting and wire rod rolling, a steel is cooled to below $A_1$ transformation point between each of the production processes and, for this reason, carbides precipitate as early as immediately after the continuous casting. Therefore, for decreasing the globular cementite carbides retained after wire rod rolling, it is necessary to secure a high temperature and a long time sufficient for dissolving the coarse carbides in a steel in the heating of the billet rolling and that of the wire rod rolling.

EXAMPLE

Example 1

Table 1 shows examples according to the present invention and comparative examples.

Steels were melted and refined in a 250-t converter and produced into billets by continuous casting. In the other examples, steels were melted and refined in a 2-t vacuum melting furnace and then produced into billets by rolling. The steels of the invented examples were held at a high temperature of 1,200° C. or more for a prescribed time. Then, in either case, the billets were rolled into bars 8 mm in diameter and then drawn into wires 4 mm in diameter. In the comparative examples, on the other hand, the billets were rolled under normal rolling conditions and, then, subjected to wire drawing.

In the tables, heat treatment methods, OT, IQT and F indicate oil temper treatment, high frequency quenching and tempering, and quenching and tempering using an off-line batch furnace (a radiation furnace), respectively.

Since the present invention features excellent properties in rolling defect property and material properties after the post-rolling quenching and tempering, quite different from those obtained through conventional technologies, the material properties were evaluated after rolling and also after quenching and tempering. The existence or otherwise of rolling defects was observed visually immediately after rolling.

After being drawn to a diameter of 4 mm, the steel wires were quenched and tempered through so-called oil quenching and tempering treatment, wherein they were quenched by being heated in a radiation furnace and, immediately thereafter, cooled in an oil bath and then tempered by being heated in a molten Pb bath.

In the oil quenching and tempering treatment, the drawn wires were made to pass through a heating furnace continuously, and the residence time in the heating furnace was controlled so that the wires were well heated to the center portion. If the heating is insufficient, hardening becomes insufficient and a sufficient strength is not obtained. In this example, the heating temperature was set at 950° C., the heating time at 150 sec. and the quenching temperature (oil bath temperature) at 50° C. Then, the strength of the wires was controlled through the tempering at a tempering temperature of 400 to 550° C. and a tempering time of 1 min. The heating temperature for the quenching and tempering and the tensile strength in the normal atmosphere obtained through the treatment were as shown in Table 1. The tensile strength was controlled to 2,100 MPa or so.

The globular carbides in a steel including cementite, which is considered to be important in the present invention, are also listed in the table. The size and number of the carbides were evaluated by polishing a longitudinal sectional plane of a hot-rolled wire rod or an as-heat-treated steel wire in mirror finish and, then, lightly etching the plane with picric acid so that the carbides appear on the sectional plane. Since it is difficult to measure the size of the carbides at the magnification level of an optical microscope, micrographs of 10 observation fields were taken at random at the portion of ½ R of a hot-rolled wire rod and a steel wire under a magnification of 5,000 using a scanning electron microscope. Then, in the micrographs, globular cementite carbides were identified from among globular carbides using an X-ray microanalyzer attached to the scanning electron microscope, and their size and number were measured using an image processor. The circle-equivalent diameter of each of the globular carbides and their density were calculated from the data thus obtained. The total measured area was 3,088.8 $\mu m^2$.

The tensile property of a sample was tested in compliance with Japanese Industrial Standard (JIS) Z 2241 using No. 9 test pieces according to JIS Z 2201, and tensile strength was calculated from the breaking force at the test.

Figure 4A:
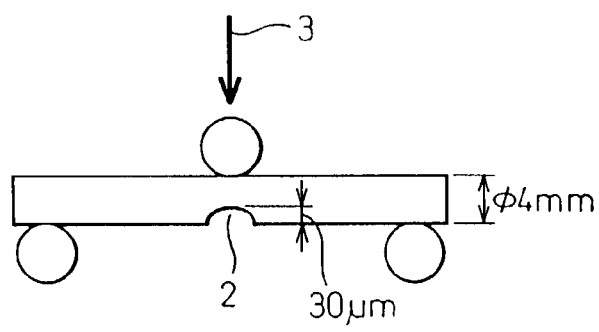
FIGS. 4(a) and 4(b) are illustrations showing the notch bending test method.
Figure 4B:
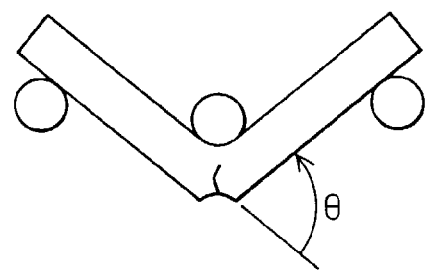

The ductility of a sample was evaluated by a notch bending test in the following manner, an outline of which is shown in FIG. 4. As seen in FIG. 4(a), a groove 2 (notch) 30 $\mu m$ in maximum depth running in right angles to the longitudinal direction of a steel wire was cut in a test piece using a punch having an apex radius of 50 $\mu m$, the test piece was held at both the ends so that the maximum tensile load was imposed on the notched portion, three-point bending deformation force was applied to the test piece by imposing a load 3 at the center, the bending deformation force was imposed until the test piece broke at the notched portion, and the bending angle at the time of the breakage shown in FIG. 4(b) was measured. The larger the measured angle (θ), the better the coiling property. Empirically, if the notch bending angle of a steel wire 4 mm in diameter is 250 or less, coiling work is difficult.

In the invented examples, the size of globular carbides after rolling was small, no rolling defects were seen, and a high strength and a good notch bending property were realized after the quenching and tempering. It is seen from the table that comparative examples, in contrast, were inferior in the notch bending property and the coiling property. Further, rolling defects were found in them, witnessing a difficulty in the rolling operation.

Table 2 shows the chemical compositions, the existence or otherwise of rolling defects, the density of the carbides 0.2 to 3 $\mu m$ in circle-equivalent diameter, the density of the carbides over 3 $\mu m$ in circle-equivalent diameter, the tensile strength and the coiling property (the reduction of area at the tensile test) of the invented and comparative examples rolled initially into wire rods 15 mm in diameter, drawn to a diameter of 12 mm and then oil-tempered.

After being drawn to the diameter of 12 mm, the samples underwent annealing at 400° C. for 20 min. simulating the oil quenching and tempering and the stress relief annealing in spring manufacturing so that their tensile strength was controlled to 1,950 to 2,000 MPa.

The evaluation results of the steel wires 12 mm in diameter in Table 2 show that, in comparative examples having a carbide density outside the range of the present invention, the reduction of area, which is an indicator of the coiling property, is small and, when the density of the carbides over 3 $\mu m$ in circle-equivalent diameter is 0.005 piece/$\mu m^2$ or more immediately after rolling, the carbides are retained after the heat treatment and deteriorate the reduction of area. This is suspected to have caused an inferior coiling property.

From Tables 1 and 2, it is understood that, in the steels outside the ranges of the present invention, basically, rolling defects are likely to persist. The globular cementite carbides are suspected to be largely responsible for this; globular cementite carbides exceeding the range specified in the present invention were detected in the observation of the sound portions of these steels after rolling. This indicates that, even when austenite is formed through two or more heatings, if carbides remain in the precursor structure, cracks and other defects are likely to occur easily during subsequent processes such as wire rod rolling, coiling after oil quenching and tempering treatment and hot coiling.

[Tables 1 and 2]

TABLE 1

| Example | No. | Chemical composition | | | | | | | | | | | | | | | | | Density (after rolling) | | Rolling defects | Density (after OT) | | Tensile strength MPa | Notch bending angle° |
|---|---|---|---|---|---|---|---|---|---|---|---|---|---|---|---|---|---|---|---|---|---|---|---|---|---|
| | | C | Si | Mn | P | S | Cr | W | Co | Ti | V | Mo | Nb | Ni | Cu | B | Mg | N | 0.2-3 | <3 | | 0.2-3 | <3 | | |
| Invented example | 1 | 0.70 | 1.46 | 0.77 | 0.015 | 0.004 | 0.20 | — | — | — | — | — | — | — | — | — | 0.0009 | 0.0048 | 0.0630 | 0.0016 | ○ | 0.179 | 0.0008 | 2107 | 38 |
| Invented example | 2 | 0.67 | 1.91 | 1.11 | 0.009 | 0.013 | 0.17 | — | — | — | — | — | — | — | — | — | 0.0006 | 0.0049 | 0.0045 | 0.0005 | ○ | 0.022 | 0.0018 | 2132 | 37 |
| Invented example | 3 | 0.64 | 1.99 | 0.32 | 0.006 | 0.003 | 0.18 | 0.17 | — | — | — | — | — | — | — | — | 0.0009 | 0.0041 | 0.0427 | 0.0009 | ○ | 0.140 | 0.0006 | 2106 | 37 |
| Invented example | 4 | 0.73 | 1.93 | 0.51 | 0.004 | 0.004 | 0.30 | 0.07 | — | 0.068 | — | — | — | — | — | — | 0.0005 | 0.0035 | 0.0695 | 0.0010 | ○ | 0.177 | 0.0007 | 2060 | 38 |
| Invented example | 5 | 0.63 | 2.15 | 0.31 | 0.012 | 0.004 | 0.16 | — | — | — | 0.19 | — | — | — | — | — | 0.0010 | 0.0048 | 0.0702 | 0.0010 | ○ | 0.199 | 0.0008 | 2136 | 34 |
| Invented example | 6 | 0.70 | 1.92 | 0.41 | 0.012 | 0.010 | 0.20 | 0.19 | — | — | — | — | — | — | — | — | 0.0005 | 0.0036 | 0.0272 | 0.0006 | ○ | 0.108 | 0.0006 | 2159 | 39 |
| Invented example | 7 | 0.63 | 1.89 | 1.12 | 0.013 | 0.011 | 0.27 | 0.20 | — | — | — | 0.44 | — | — | — | — | 0.0010 | 0.0048 | 0.0247 | 0.0015 | ○ | 0.072 | 0.0013 | 2089 | 36 |
| Invented example | 8 | 0.61 | 1.86 | 1.20 | 0.014 | 0.009 | 0.16 | 0.13 | — | — | — | — | 0.039 | — | — | — | 0.0005 | 0.0043 | 0.0174 | 0.0013 | ○ | 0.056 | 0.0010 | 2055 | 33 |
| Invented example | 9 | 0.66 | 1.65 | 0.73 | 0.010 | 0.007 | 0.29 | 0.22 | — | — | — | — | — | 0.44 | — | — | 0.0009 | 0.0036 | 0.0126 | 0.0007 | ○ | 0.062 | 0.0013 | 2128 | 38 |
| Invented example | 10 | 0.73 | 1.83 | 0.98 | 0.010 | 0.010 | 0.29 | 0.15 | — | — | — | — | — | 0.23 | 0.19 | — | 0.0011 | 0.0038 | 0.0115 | 0.0014 | ○ | 0.052 | 0.0008 | 2090 | 32 |
| Invented example | 11 | 0.68 | 1.64 | 0.80 | 0.010 | 0.010 | 0.16 | 0.12 | — | 0.033 | — | — | — | — | — | 0.0028 | 0.0011 | 0.0036 | 0.0259 | 0.0017 | ○ | 0.106 | 0.0011 | 2155 | 39 |
| Invented example | 12 | 0.60 | 2.04 | 1.16 | 0.013 | 0.004 | 0.16 | — | — | — | — | — | — | — | — | — | — | 0.0043 | 0.0611 | 0.0008 | ○ | 0.183 | 0.0017 | 2095 | 38 |
| Invented example | 13 | 0.67 | 2.14 | 0.95 | 0.007 | 0.011 | 0.28 | — | — | — | 0.09 | 0.22 | — | — | — | — | 0.0007 | 0.0035 | 0.0618 | 0.0007 | ○ | 0.156 | 0.0012 | 2094 | 35 |
| Invented example | 14 | 0.62 | 1.59 | 0.37 | 0.011 | 0.008 | 0.18 | — | — | — | 0.10 | 0.29 | — | — | — | — | 0.0010 | 0.0045 | 0.0300 | 0.0012 | ○ | 0.137 | 0.0011 | 2159 | 39 |
| Invented example | 15 | 0.63 | 2.08 | 0.44 | 0.005 | 0.004 | 0.29 | — | 0.14 | — | 0.30 | 0.05 | — | — | — | — | 0.0007 | 0.0027 | 0.0395 | 0.0015 | ○ | 0.152 | 0.0016 | 2096 | 38 |
| Invented example | 16 | 0.62 | 2.06 | 0.90 | 0.014 | 0.010 | 0.19 | — | 0.14 | — | 0.09 | 0.13 | 0.049 | — | — | — | 0.0008 | 0.0027 | 0.0390 | 0.0014 | ○ | 0.108 | 0.0006 | 2143 | 38 |
| Invented example | 17 | 0.69 | 1.82 | 0.73 | 0.008 | 0.011 | 0.24 | — | 0.22 | — | 0.13 | 0.07 | 0.044 | — | — | — | 0.0009 | 0.0028 | 0.0356 | 0.0010 | ○ | 0.117 | 0.0007 | 2088 | 33 |
| Invented example | 18 | 0.71 | 2.19 | 0.47 | 0.004 | 0.005 | 0.17 | — | 0.25 | — | 0.15 | 0.22 | 0.046 | 0.47 | — | — | 0.0007 | 0.0034 | 0.0166 | 0.0017 | ○ | 0.052 | 0.0010 | 2065 | 33 |

TABLE 1-continued

| | | Chemical composition | | | | | | | | | | | | | | | | | Density (after rolling) | | Rolling | Density (after OT) | | Tensile strength | Notch bending |
|---|---|---|---|---|---|---|---|---|---|---|---|---|---|---|---|---|---|---|---|---|---|---|---|---|
| Example | No. | C | Si | Mn | P | S | Cr | W | Co | Ti | V | Mo | Nb | Ni | Cu | B | Mg | N | 0.2-3 | <3 | defects | 0.2-3 | <3 | MPa | angle° |
| Invented example | 19 | 0.73 | 2.25 | 0.97 | 0.014 | 0.007 | 0.24 | 0.18 | | | 0.07 | 0.26 | 0.014 | | | 0.0027 | — | 0.0034 | 0.0311 | 0.0006 | ○ | 0.149 | 0.0019 | 2132 | 35 |
| Invented example | 20 | 0.64 | 1.92 | 0.11 | 0.005 | 0.013 | 0.29 | 0.22 | | | 0.29 | 0.09 | 0.048 | | | 0.0023 | — | 0.0040 | 0.0386 | 0.0010 | ○ | 0.122 | 0.0016 | 2148 | 33 |
| Invented example | 21 | 0.69 | 2.09 | 1.16 | 0.010 | 0.008 | 0.25 | 0.29 | | | 0.21 | 0.16 | 0.026 | | | 0.0016 | — | 0.0032 | 0.0425 | 0.0006 | ○ | 0.129 | 0.0008 | 2155 | 37 |
| Comparative example | 22 | 0.84 | 2.14 | 0.93 | 0.012 | 0.012 | 1.19 | — | | | 0.35 | 0.10 | 0.130 | | | | | 0.0044 | 0.4016 | 0.0092 | × | | | | |
| Comparative example | 23 | 0.95 | 1.87 | 0.67 | 0.015 | 0.015 | 1.09 | — | | | 0.11 | 0.09 | 0.044 | | | | — | 0.0043 | 0.5304 | 0.0122 | × | | | | |
| Comparative example | 24 | 0.64 | 2.20 | 0.43 | 0.012 | 0.014 | 2.15 | — | | | 0.09 | 0.30 | | | | | | 0.0034 | 0.2999 | 0.0134 | ○ | 1.447 | 0.0005 | 2063 | 20 |
| Comparative example | 25 | 0.69 | 1.34 | 0.24 | 0.003 | 0.008 | 2.51 | — | | | 0.13 | 0.21 | 0.041 | | | | | 0.0034 | 0.7540 | 0.0093 | ○ | 1.060 | 0.0015 | 2111 | 22 |
| Comparative example | 26 | 0.89 | 2.01 | 0.78 | 0.005 | 0.011 | 0.54 | — | | | 0.56 | 0.45 | 0.48 | | | | — | 0.0050 | 0.2488 | 0.0090 | × | | | | |

TABLE 2

| Example | No. | C | Si | Mn | P | S | Cr | W | Co | Ti | V | Mo | Nb | Ni | Cu | B | Mg | N | Density (after rolling) 0.2-3 | <3 | Rolling defects | Density (after OT) 0.2-3 | <3 | Tensile strength MPa | Reduction of area % |
|---|---|---|---|---|---|---|---|---|---|---|---|---|---|---|---|---|---|---|---|---|---|---|---|---|---|
| Invented example | 27 | 0.52 | 2.32 | 0.97 | 0.013 | 0.007 | 0.88 | 0.07 | | | | | | | | | 0.0020 | 0.0033 | 0.0388 | 0.001 | ○ | 0.187 | 0.0011 | 1974 | 52.4 |
| Invented example | 28 | 0.49 | 1.70 | 0.34 | 0.010 | 0.006 | 0.82 | 0.12 | | | 0.15 | | | | | 0.021 | 0.0009 | 0.0037 | 0.0730 | 0.002 | ○ | 0.190 | 0.0015 | 1975 | 48.4 |
| Invented example | 29 | 0.47 | 2.03 | 0.59 | 0.013 | 0.011 | 1.07 | 0.28 | 0.13 | | 0.17 | 0.157 | | 0.25 | | | 0.0012 | 0.0041 | 0.0594 | 0.001 | ○ | 0.192 | 0.0010 | 1960 | 54.0 |
| Invented example | 30 | 0.48 | 1.67 | 0.24 | 0.003 | 0.009 | 0.84 | 0.10 | 0.25 | 0.05 | 0.10 | 0.065 | | 0.25 | 0.11 | 0.0024 | 0.0007 | 0.0048 | 0.0210 | 0.001 | ○ | 0.079 | 0.0007 | 1971 | 48.1 |
| Invented example | 31 | 0.46 | 1.72 | 1.09 | 0.013 | 0.011 | 0.80 | — | 0.09 | | 0.16 | 0.225 | 0.028375 | | | | 0.0011 | 0.0049 | 0.0034 | 0.001 | ○ | 0.014 | 0.0012 | 1967 | 50.6 |
| Invented example | 32 | 0.52 | 1.83 | 0.36 | 0.009 | 0.011 | 0.91 | — | | | 0.11 | 0.256 | 0.028139 | | | 0.0022 | 0.0005 | 0.0043 | 0.0639 | 0.001 | ○ | 0.184 | 0.0009 | 1967 | 51.0 |
| Invented example | 33 | 0.55 | 1.83 | 0.14 | 0.015 | 0.003 | 0.90 | — | | | 0.12 | 0.266 | 0.021847 | | | 0.0019 | 0.0011 | 0.0028 | 0.0468 | 0.001 | ○ | 0.177 | 0.0006 | 1960 | 50.3 |
| Comparative example | 34 | 0.57 | 1.46 | 1.02 | 0.005 | 0.010 | 0.89 | — | | 0.12 | 0.57 | 0.510 | 0.101 | | | | — | 0.0049 | 0.566 | 0.0132 | x | | | | |
| Comparative example | 35 | 0.56 | 1.55 | 0.33 | 0.010 | 0.007 | 2.21 | — | | 0.08 | 0.56 | 0.430 | 0.07 | | | | — | 0.0035 | 0.895 | 0.0150 | ○ | 1.11 | 0.0010 | 1958 | 22.7 |

Example 2

Table 3 shows examples according to the present invention and comparative examples.

The same procedures as in Example 1 were applied to the steels of the examples according to the present invention and comparative examples from the melting and refining of the steel to the production of the steel wires.

The rolling defects and the properties after the post-rolling quenching and tempering and the defects immediately after the rolling were evaluated also in the same manner as in Example 1.

After being drawn to a diameter of 4 mm, the steel wires were quenched and tempered through a so-called oil quenching and tempering treatment, wherein they were quenched by being heated in a radiation furnace and, immediately thereafter, cooled in an oil bath and then tempered by being heated in a molten Pb bath.

In the oil quenching and tempering treatment, the drawn wires were made to pass through a heating furnace continuously, and the residence time in the heating furnace was controlled so that the wires were well heated to the center portion. If the heating is insufficient, hardening is insufficient and it becomes impossible to attain a sufficient strength. In this example, the heating temperature was set at 950° C., the heating time at 150 sec. and the quenching temperature (oil bath temperature) at 50° C. Then, the strength of the wires was controlled through the tempering at a tempering temperature of 400 to 550° C. and a tempering time of 1 min. The heating temperature for the quenching and tempering and the tensile strength in the normal atmosphere obtained through the treatment were as shown in Table 3. The tensile strength was controlled to 2,150 to 2,250 MPa or so.

In the invented examples, the number and size of globular carbides after rolling were small, no rolling defects were seen, and a high strength and a good notch bending property were realized after the quenching and tempering. It is seen from the table that comparative examples, in contrast, were inferior in the notch bending property and the coiling property. Further, rolling defects were found in them, witnessing difficulty in rolling operation.

Both W and Co are considered to have the effect of suppressing the formation of coarse cementite grains, although their behaviors in steel are different: Co suppresses the formation of carbides, whereas W suppresses the growth of cementite, and thus the coarsening is suppressed.

[Table 3]

TABLE 3

| Example | No. | Chemical composition | | | | | | | | | | | | | | | | | Density (after rolling) | | Rolling defects | Density (after OT) | | Tensile strength | Notch bending |
|---|---|---|---|---|---|---|---|---|---|---|---|---|---|---|---|---|---|---|---|---|---|---|---|---|---|
| | | C | Si | Mn | P | S | Cr | W | Co | Ti | V | Mo | Nb | Ni | Cu | B | Mg | N | 0.2-3 | <3 | | 0.2-3 | <3 | MPa | angle° |
| Invented example | 36 | 0.82 | 1.77 | 0.85 | 0.007 | 0.008 | 0.34 | 0.13 | — | | | | | | | | 0.0009 | 0.0028 | 0.019 | 0.0020 | ○ | 0.052 | 0.0007 | 2170 | 33 |
| Invented example | 37 | 0.84 | 1.86 | 0.84 | 0.009 | 0.005 | 0.44 | 0.28 | — | | | | | | | | 0.0008 | 0.0028 | 0.015 | 0.0008 | ○ | 0.050 | 0.0013 | 2245 | 32 |
| Invented example | 38 | 0.82 | 1.71 | 0.80 | 0.006 | 0.013 | 0.42 | 0.06 | — | 0.023 | | | | | | | 0.0007 | 0.0044 | 0.005 | 0.0008 | ○ | 0.022 | 0.0009 | 2249 | 30 |
| Invented example | 39 | 0.82 | 1.79 | 0.76 | 0.009 | 0.009 | 0.44 | 0.13 | — | | 0.29 | | | | | | 0.0005 | 0.0037 | 0.005 | 0.0016 | ○ | 0.016 | 0.019 | 2206 | 28 |
| Invented example | 40 | 0.81 | 1.89 | 1.08 | 0.011 | 0.008 | 0.34 | 0.18 | — | | | 0.15 | | | | | 0.0005 | 0.0030 | 0.004 | 0.0006 | ○ | 0.013 | 0.012 | 2206 | 28 |
| Invented example | 41 | 0.81 | 1.76 | 0.91 | 0.008 | 0.006 | 0.48 | 0.18 | 0.14 | | | 0.19 | | | | | 0.0010 | 0.0028 | 0.035 | 0.0005 | ○ | 0.108 | 0.005 | 2206 | 30 |
| Invented example | 42 | 0.81 | 1.84 | 0.91 | 0.013 | 0.005 | 0.41 | 0.22 | 0.28 | | | | 0.041 | | | | 0.0004 | 0.0046 | 0.007 | 0.0019 | ○ | 0.025 | 0.0013 | 2153 | 33 |
| Invented example | 43 | 0.84 | 1.83 | 1.06 | 0.011 | 0.005 | 0.35 | 0.24 | 0.20 | | | | | 0.46 | | | 0.0004 | 0.0036 | 0.031 | 0.0009 | ○ | 0.090 | 0.0005 | 2186 | 29 |
| Invented example | 44 | 0.81 | 1.86 | 1.06 | 0.015 | 0.005 | 0.35 | 0.26 | 0.25 | | | | | 0.33 | 0.31 | | 0.0005 | 0.0047 | 0.008 | 0.0008 | ○ | 0.030 | 0.0015 | 2151 | 29 |
| Invented example | 45 | 0.85 | 1.72 | 0.93 | 0.009 | 0.013 | 0.39 | 0.17 | 0.29 | | | | | | | | — | 0.0027 | 0.044 | 0.0013 | ○ | 0.113 | 0.0013 | 2218 | 31 |
| Invented example | 46 | 0.84 | 1.71 | 0.95 | 0.011 | 0.004 | 0.36 | 0.14 | 0.15 | 0.031 | | | | | | 0.0021 | — | 0.0044 | 0.067 | 0.0008 | ○ | 0.177 | 0.0006 | 2248 | 31 |
| Invented example | 47 | 0.81 | 2.29 | 0.21 | 0.007 | 0.003 | 0.27 | 0.20 | 0.28 | | | | | | | | — | 0.0032 | 0.219 | 0.0012 | ○ | 0.609 | 0.0018 | 2270 | 30 |
| Invented example | 48 | 0.91 | 2.15 | 1.16 | 0.009 | 0.012 | 0.47 | 0.28 | — | | 0.031 | | | | | | 0.0008 | 0.0028 | 0.189 | 0.0009 | ○ | 0.626 | 0.0017 | 2212 | 32 |
| Invented example | 49 | 0.83 | 1.77 | 0.60 | 0.006 | 0.005 | 0.24 | 0.13 | — | | | | | | | | 0.0007 | 0.0048 | 0.145 | 0.0020 | ○ | 0.418 | 0.0018 | 2226 | 28 |
| Invented example | 50 | 0.80 | 2.04 | 1.13 | 0.011 | 0.011 | 0.41 | 0.15 | — | | | | | | | | — | 0.0032 | 0.036 | 0.0019 | ○ | 0.177 | 0.0009 | 2205 | 30 |
| Invented example | 51 | 0.80 | 1.41 | 0.30 | 0.007 | 0.012 | 0.10 | — | 0.21 | | 0.20 | 0.31 | | | | | 0.0010 | 0.0045 | 0.266 | 0.0018 | ○ | 0.726 | 0.0008 | 2239 | 30 |
| Invented example | 52 | 0.86 | 2.28 | 0.53 | 0.013 | 0.007 | 0.18 | — | 0.15 | | 0.48 | | | | | | 0.0007 | 0.0036 | 0.041 | 0.0007 | ○ | 0.142 | 0.0018 | 2214 | 28 |
| Invented example | 53 | 1.09 | 2.30 | 1.13 | 0.009 | 0.013 | 0.48 | — | 0.26 | | 0.41 | | | | 0.32 | | 0.0012 | 0.0030 | 0.013 | 0.0009 | ○ | 0.059 | 0.0019 | 2172 | 29 |

TABLE 3-continued

| Example | No. | Chemical composition | | | | | | | | | | | | | | | | | N | Density (after rolling) | | Rolling defects | Density (after OT) | | Tensile strength | Notch bending |
| --- | --- | --- | --- | --- | --- | --- | --- | --- | --- | --- | --- | --- | --- | --- | --- | --- | --- | --- | --- | --- | --- | --- | --- | --- | --- |
| | | C | Si | Mn | P | S | Cr | W | Co | Ti | V | Mo | Nb | Ni | Cu | B | Mg | | 0.2-3 | <3 | | 0.2-3 | <3 | MPa | angle° |
| Invented example | 54 | 0.89 | 2.30 | 0.19 | 0.008 | 0.013 | — | 0.27 | 0.27 | | 0.34 | 0.23 | | | | | 0.0006 | 0.0046 | 0.110 | 0.0010 | ○ | 0.0393 | 0.0019 | 2230 | 33 |
| Invented example | 55 | 0.99 | 1.82 | 0.23 | 0.008 | 0.007 | — | 0.16 | 0.24 | | 0.48 | 0.23 | | | | | 0.0006 | 0.0030 | 0.008 | 0.0012 | ○ | 0.034 | 0.0014 | 2192 | 30 |
| Invented example | 56 | 0.98 | 2.27 | 0.78 | 0.004 | 0.008 | — | 0.24 | 0.29 | | 0.30 | 0.40 | | | | | 0.0007 | 0.0041 | 0.102 | 0.0016 | ○ | 0.420 | 0.0008 | 2190 | 31 |
| Comparative example | 57 | 0.91 | 1.72 | 0.97 | 0.014 | 0.005 | 1.56 | — | — | | 0.45 | 0.28 | | | | | | 0.0046 | 0.680 | 0.0091 | x | | | | |
| Comparative example | 58 | 0.98 | 2.02 | 1.02 | 0.005 | 0.013 | 0.80 | — | — | | 0.47 | 0.30 | | | | | | 0.0046 | 0.398 | 0.0104 | ○ | 1.340 | 0.0115 | 2263 | 19 |
| Comparative example | 59 | 0.87 | 2.12 | 0.20 | 0.012 | 0.007 | 0.45 | — | — | | 0.28 | 0.48 | | 0.16 | 0.21 | | | 0.0042 | 0.460 | 0.0084 | ○ | 1.800 | 0.0093 | 2208 | 21 |
| Comparative example | 60 | 0.74 | 2.15 | 0.52 | 0.006 | 0.008 | 0.96 | 0.16 | — | | 0.28 | 0.31 | | | | | | 0.0030 | 0.006 | 0.0120 | ○ | 0.011 | 0.0132 | 2163 | 20 |
| Comparative example | 61 | 0.76 | 1.98 | 0.40 | 0.003 | 0.009 | 1.56 | 0.18 | 0.16 | | 0.26 | 0.16 | | | | | | 0.0049 | 0.156 | 0.0139 | x | | | | |

Example 3

Table 4 shows the chemical compositions, the heat treatment method, the percentage of the area occupied by globular cementite carbides, the density of the globular cementite carbides 0.2 to 3 μm in circle-equivalent diameter, the density of the globular cementite carbides over 3 μm in circle-equivalent diameter, the maximum diameter of carbides, the maximum diameter of oxides, the prior austenite grain size number, the tensile strength, the coiling property (notch bending angle) and the average fatigue strength (rotary bending) of the invented and comparative examples drawn to a diameter of 4 mm.

In examples 36 and 53, steels were melted and refined in a 250-t converter and produced into billets by continuous casting. In the other examples, steels were melted and refined in a 2-t vacuum melting furnace and then produced into billets by rolling. The steels of the invented examples were held at a high temperature of 1,200° C. or more for a prescribed time. Then, in either case, the billets were rolled into bars 8 mm in diameter and then drawn into wires 4 mm in diameter. In the comparative examples, on the other hand, the billets were rolled under normal rolling conditions and, then, subjected to wire drawing.

In view of the fact that a carbide amount and steel strength vary depending on a chemical composition, the invented examples were heat-treated according to their respective chemical compositions so that their tensile strength became 2,100 to 2,200 MPa or so and the other property figures fell within their respective ranges according to the present invention. On the other hand, comparative examples were heat-treated so that only their tensile strength fell within the range according to the present invention.

In the treatment in a batch furnace, test pieces 1 m in length were straightened and quenched by heating in a heating furnace and making them pass through an oil tank kept at 60° C. The heating time was set at 30 min. and the temperature history was adjusted so as to correspond to that of the hot-coiled springs manufactured by the hot coiling method. After the quenching, the test pieces were charged again into a heating furnace for tempering in order to control the tensile strength in normal atmosphere. The heating temperature for the quenching and tempering and the tensile strength in normal atmosphere obtained through the quenching and tempering were as shown in Table 3.

In the oil quenching and tempering treatment, the drawn wires were made to pass through a heating furnace continuously, and the residence time in the heating furnace was controlled so that the wires were well heated to the center portion. In this example, the heating temperature was set at 950° C., the heating time at 150 sec. and the quenching temperature (oil bath temperature) at 50° C. Then, the strength of the wires was controlled through the tempering at a tempering temperature of 400 to 550° C. and a tempering time of 1 min. The heating temperature for the quenching and tempering and the tensile strength in the normal atmosphere obtained through the treatment were as shown in Table 3.

In the high frequency heat treatment, the test pieces were heated by making them pass through an induction coil and then water-cooled immediately after passing through the coil. The heating temperature was 990° C., the heating time 15 sec., and the test pieces were quenched through the water-cooling (room temperature). Thereafter, they were tempered at a tempering temperature of 430 to 600° C. by making them pass through the coil again. The tensile strength in the normal atmosphere thus obtained was as shown in Table 1.

The steel wires thus prepared were subjected to the evaluation of carbides, the tensile test and the notch bending test without further treatment. As for the evaluation of the fatigue property, test pieces were prepared by applying a heat treatment at 400° C. for 20 min. simulating the stress relief annealing in spring manufacturing, a shot peening treatment (for 20 min. with cut wires 0.6 mm in diameter) and then a low temperature stress relief annealing at 180° C. for 20 min.

The evaluation of the size and number of carbides and the notch bending test were done in the same manner as in Example 1.

The fatigue test was done using a Nakamura's rotary bending tester, wherein the maximum load stress under which 10 test pieces withstood $10^7$ cycles or more of bending with a probability of 50% or more was used as the average fatigue strength.

Table 5 shows the chemical compositions, the heat treatment method, the percentage of the area occupied by globular cementite carbides, the density of the globular cementite carbides 0.2 to 3 μm in circle-equivalent diameter, the density of the globular cementite carbides over 3 μm in circle-equivalent diameter, the prior austenite grain size number, the tensile strength, the coiling property (the reduction of area in the tensile test), the fatigue strength, and the delayed fracture strength of the invented and comparative examples drawn to a diameter of 12 mm.

In the examples, the steels were melted and refined in a 2-t vacuum melting furnace and then produced into billets by rolling. Thereafter, in either case, the billets were rolled into the bars 14 mm in diameter and then drawn into the wire rods 12 mm in diameter.

In this case, since the test pieces were thicker than the test pieces 4 mm in diameter, the reduction of area in the tensile test was used as the indicator of the coiling property.

The fatigue strength was evaluated through the fatigue test using an Ono's rotary bending tester, and the fatigue limit was used as the fatigue strength.

The test method of evaluating delayed fracture strength is shown in FIG. 5. FIG. 5(a) shows the shape of a test piece 4. Using the delayed fracture tester shown in FIG. 5(b), load 5 is imposed on the test piece 4 having a circumferential notch in a vessel while hydrogen is charged, and the time until the breakage occurs under the condition is measured. The test piece 4 is held in a solution 7 ($H_2SO_4$, pH 3.0) kept at 30° C. by a band heater, and is tested using a constant current power source 8 (at a current density of 1.0 mA/cm$^2$) using the test piece as the cathode and a platinum electrode as the anode 9. When the load is changed in such a test, the maximum load W which the test piece withstands for a loading time of 200 h. can be measured. The nominal stress (or W/S) calculated by dividing the maximum load W by the sectional area S at the bottom of the circumferential notch was used as the value of the delayed fracture strength.

In the case that the steel wires were drawn to a diameter of 12 mm, the test pieces for the fatigue test and the delayed fracture test underwent only annealing at 400° C. for 20 min.

simulating the stress relief annealing. The shot peening treatment and the subsequent stress relief annealing, which were applied to the samples 4 mm in diameter, were omitted.

As seen in Table 4, in the case that the steel wires were drawn to a diameter of 4 mm, in the comparative examples having the percentage of the area occupied by the globular cementite carbides and the density of the globular cementite carbides falling outside their respective ranges specified in the present invention, the bending angle at the notch bending test, which is an indicator of the coiling property, is too small for successful coiling work even though the chemical composition is within the range of the present invention. On the other hand, even when the specifications regarding carbides are satisfied, if strength is not sufficient, fatigue strength becomes insufficient and the material cannot be used for high-strength springs.

As seen in the evaluation results of the steel wires 12 mm in diameter shown in Table 5, in comparative examples having the percentage of the area occupied by the globular cementite carbides and the density of the globular cementite carbides falling outside their respective ranges specified in the present invention, the reduction of area, which is another indicator of the coiling property, is small even when the chemical composition is within the range of the present invention. In addition, when strength is lowered in an attempt to improve the above, fatigue strength deteriorates. The grain size of austenite has an influence on fatigue and delayed fracture properties; in the case that austenite grain size was large, even though the specifications regarding carbides were satisfied, the fatigue and delayed fracture properties were insufficient.

It has to be noted, however, that the austenite grain size can be decreased by measures such as lowering the heating temperature of quenching and making the heating time short but, as these measures leave many carbides in an insoluble state, adversely, it becomes difficult to satisfy the specifications of the present invention. For this reason, the introduction of a technology to enable a short time, high temperature heating for dissolving carbides such as oil quenching and tempering and high frequency heat treatment is important and, as seen in Tables 1 and 2, it is difficult to realize both a high strength and a good coiling property at the same time by means of a fast but imperfect treatment in a batch furnace. This also means that the production of high-strength springs is difficult using the low temperature short time quenching.

[Tables 4 and 5]

TABLE 4

| Example | No. | Chemical composition | | | | | | | | | | | | | | | | | | Heat treatment method | Area percentage % | Density 0.2-3 | Density >3 | Max. carbide grain size μm | Max. oxide grain size μm | Prior austenite grain size number | Tensile strength MPa | Notch bending angle° | Rotary bending MPa |
|---|---|---|---|---|---|---|---|---|---|---|---|---|---|---|---|---|---|---|---|---|---|---|---|---|---|---|---|---|---|
| | | C | Si | Mn | P | S | Cr | Ti | V | Nb | Mo | W | Ni | Cu | Co | B | Mg | N | | | | | | | | | | |
| Invented example | 62 | 0.75 | 2.19 | 0.80 | 0.008 | 0.010 | 0.97 | | | | | | | | | | 0.0006 | 0.0029 | OT | 3.2 | 0.26 | <0.0001 | 12.4 | 12.0 | 11 | 2098 | 33 | 850 |
| Invented example | 63 | 0.83 | 2.42 | 0.25 | 0.004 | 0.006 | 0.06 | | | | | | | | | | 0.0009 | 0.0052 | OT | 0.2 | 0.03 | <0.0001 | 12.0 | 12.7 | 11 | 2118 | 28 | 852 |
| Invented example | 64 | 0.83 | 1.78 | 0.24 | 0.004 | 0.008 | 0.51 | 0.01 | | | | | | | | | 0.0007 | 0.0025 | OT | 2.7 | 0.06 | <0.0001 | 12.5 | 11.7 | 13 | 2165 | 34 | 861 |
| Invented example | 65 | 0.89 | 1.61 | 0.26 | 0.004 | 0.004 | 0.26 | | 0.2 | | | | | | | | 0.0008 | 0.0049 | OT | 0.3 | 0.09 | <0.0001 | 10.3 | 10.5 | 12 | 2118 | 31 | 860 |
| Invented example | 66 | 0.84 | 1.49 | 1.03 | 0.004 | 0.004 | 0.48 | | | 0.02 | | | | | | | 0.0007 | 0.0025 | OT | 0.7 | 0.15 | <0.0001 | 12.3 | 10.4 | 13 | 2118 | 32 | 865 |
| Invented example | 67 | 0.75 | 1.82 | 1.02 | 0.006 | 0.006 | 0.87 | | | | 0.3 | | | | | | 0.0008 | 0.0050 | OT | 0.5 | 0.30 | <0.0001 | 12.6 | 11.2 | 11 | 2156 | 32 | 882 |
| Invented example | 68 | 0.69 | 1.85 | 1.07 | 0.005 | 0.011 | 1.27 | | | | | 0.1 | | | | | 0.0010 | 0.0034 | OT | 3.6 | 0.220 | <0.0001 | 11.0 | 12.6 | 12 | 2201 | 28 | 850 |

TABLE 4-continued

| Example No. | Chemical composition | | | | | | | | | | | | | | | | | | Heat treatment method | Area percentage % | Density 0.2-3 | Density >3 | Max. carbide grain size µm | Max. oxide grain size µm | Prior austenite grain size number | Tensile strength MPa | Notch bending angle° | Rotary bending MPa |
|---|---|---|---|---|---|---|---|---|---|---|---|---|---|---|---|---|---|---|---|---|---|---|---|---|---|---|---|---|
| | C | Si | Mn | P | S | Cr | Ti | V | Nb | Mo | W | Ni | Cu | Co | B | Mg | N | | | | | | | | | | |
| 69 Invented example | 0.73 | 1.21 | 1.10 | 0.010 | 0.007 | 0.56 | | | | | | 0.5 | | | | 0.0010 | 0.0022 | OT | 0.0 | 0.20 | <0.0001 | 12.1 | 11.7 | 13 | 2166 | 31 | 859 |
| 70 Invented example | 0.71 | 1.64 | 1.18 | 0.007 | 0.008 | 0.99 | | | | | | 0.2 | 0.2 | | | 0.0008 | 0.0031 | OT | 0.8 | 0.40 | <0.0001 | 10.9 | 10.3 | 11 | 2117 | 33 | 877 |
| 71 Invented example | 0.71 | 2.10 | 0.73 | 0.009 | 0.004 | 0.55 | | | | | | | | 0.2 | | 0.0007 | 0.0057 | OT | 1.7 | 0.04 | <0.0001 | 12.9 | 12.6 | 10 | 2159 | 33 | 860 |
| 72 Invented example | 0.75 | 2.52 | 0.95 | 0.008 | 0.009 | 0.62 | 0.017 | | | | | | | | 0.002 | 0.0009 | 0.0030 | OT | 1.9 | 0.17 | <0.0001 | 11.8 | 11.0 | 10 | 2114 | 33 | 860 |
| 73 Invented example | 0.86 | 1.77 | 0.70 | 0.010 | 0.009 | 0.51 | | 0.5 | | | | | | | | 0.0007 | 0.0055 | OT | 1.9 | 0.16 | <0.0001 | 10.8 | 10.0 | 13 | 2178 | 30 | 856 |
| 74 Invented example | 0.75 | 1.21 | 0.35 | 0.008 | 0.010 | 0.68 | | | | | | | | | | 0.0012 | 0.0056 | IQT | 0.5 | 0.08 | <0.0001 | 10.8 | 11.6 | 13 | 2109 | 29 | 863 |
| 75 Invented example | 0.75 | 2.20 | 0.95 | 0.011 | 0.010 | 0.47 | | | | | | | | | | 0.0009 | 0.0034 | IQT | 0.3 | 0.11 | <0.0001 | 11.5 | 12.4 | 13 | 2120 | 32 | 853 |

TABLE 4-continued

| Example No. | | Chemical composition | | | | | | | | | | | | | | | | Heat treatment method | Area percentage % | Density 0.2-3 | Density >3 | Max. carbide grain size μm | Max. oxide grain size μm | Prior austenite grain size number | Tensile strength MPa | Notch bending angle° | Rotary bending MPa |
|---|---|---|---|---|---|---|---|---|---|---|---|---|---|---|---|---|---|---|---|---|---|---|---|---|---|---|---|
| | C | Si | Mn | P | S | Cr | Ti | V | Nb | Mo | W | Ni | Cu | Co | B | Mg | N | | | | | | | | | |
| 76 Invented example | 0.65 | 2.03 | 0.69 | 0.003 | 0.003 | 0.18 | | | | | | | | | | — | 0.0045 | IQT | 0.7 | 0.007 | <0.0001 | 12.8 | 10.3 | 12 | 2152 | 34 | 852 |
| 77 Invented example | 0.83 | 1.79 | 0.37 | 0.008 | 0.011 | 0.39 | | 0.1 | | 0.1 | 0.1 | | | | | 0.0005 | 0.0027 | OT | 6.3 | 0.25 | <0.0001 | 11.0 | 12.7 | 12 | 2244 | 32 | 881 |
| 78 Invented example | 0.75 | 2.32 | 0.26 | 0.008 | 0.011 | 0.07 | | | 0.04 | | | | | | | 0.0010 | 0.0047 | OT | 0.4 | 0.04 | <0.0001 | 10.1 | 12.0 | 10 | 2108 | 29 | 852 |
| 79 Invented example | 0.78 | 1.36 | 0.88 | 0.006 | 0.006 | 0.49 | | 0.1 | | | | 0.1 | | | | 0.0008 | 0.0023 | IQT | 0.1 | 0.15 | <0.0001 | 10.8 | 10.1 | 12 | 2154 | 30 | 863 |
| 80 Invented example | 0.79 | 1.58 | 0.73 | 0.012 | 0.007 | 1.33 | | 0.3 | | 0.1 | 0.2 | | | 0.1 | | | 0.0035 | OT | 6.5 | 0.34 | <0.0001 | 11.5 | 12.8 | 11 | 2252 | 33 | 866 |
| 81 Invented example | 0.69 | 2.53 | 0.68 | 0.006 | 0.006 | 0.71 | | 0.2 | 0.01 | 0.2 | 0.1 | | | 0.2 | | | 0.0022 | OT | 0.2 | 0.14 | <0.0001 | 10.1 | 11.9 | 11 | 2189 | 30 | 872 |
| 82 Invented example | 0.70 | 2.60 | 0.65 | 0.005 | 0.011 | 0.02 | | 0.15 | | 0.1 | 0.15 | | | | | | 0.0058 | OT | 0.1 | 0.01 | <0.0001 | 10.4 | 10.1 | 10 | 2165 | 31 | 850 |

TABLE 4-continued

| Example No. | Chemical composition | | | | | | | | | | | | | | | | | | | | N | Heat treatment method | Area percentage % | Density 0.2-3 | Density >3 | Max. carbide grain size μm | Max. oxide grain size μm | Prior austenite grain size number | Tensile strength MPa | Notch bending angle° | Rotary bending MPa |
|---|---|---|---|---|---|---|---|---|---|---|---|---|---|---|---|---|---|---|---|---|---|---|---|---|---|---|---|---|---|---|
| | C | Si | Mn | P | S | Cr | Ti | V | Nb | Mo | W | Ni | Cu | Co | B | Mg | | | | | | | | | | | | | |
| Comparative example 83 | 0.78 | 1.45 | 0.82 | 0.008 | 0.009 | 1.09 | | 0.35 | 0.06 | 0.1 | | | | | | | 0.0031 | OT | 9.2 | 0.43 | <0.0001 | 13.0 | 11.2 | 12 | 2183 | 22 | 861 |
| Comparative example 84 | 0.82 | 1.68 | 0.38 | 0.003 | 0.003 | 0.82 | | 0.11 | | 0.09 | | | | | | | 0.0034 | IQT | 9.9 | 1.34 | <0.0001 | 11.7 | 11.9 | 13 | 2173 | 19 | 878 |
| Comparative example 85 | 0.68 | 1.21 | 0.66 | 0.007 | 0.010 | 1.68 | | 0.35 | 0.02 | 0.21 | | | | | | | 0.0041 | OT | 8.0 | 1.50 | <0.0001 | 12.4 | 11.4 | 11 | 2245 | 20 | 872 |
| Comparative example 86 | 0.77 | 1.88 | 0.93 | 0.003 | 0.006 | 1.48 | | 0.1 | | 0.22 | | | | | | | 0.0042 | OT | 4.4 | 0.24 | <0.0001 | 12.2 | 10.3 | 10 | 2178 | 33 | 792 |
| Comparative example 87 | 0.76 | 2.57 | 0.96 | 0.010 | 0.012 | 0.54 | | | | 0.15 | | | | | | | 0.0023 | F | 0.4 | 0.03 | <0.0001 | 11.3 | 10.4 | 9 | 2119 | 18 | 857 |
| Comparative example 88 | 0.78 | 2.58 | 0.40 | 0.007 | 0.004 | 1.68 | | 0.45 | 0.12 | 0.16 | | | | | | | 0.0023 | F | 1.6 | 0.26 | <0.0001 | 20.0 | 12.7 | 12 | 2162.1 | 21 | 855 |
| Comparative example 89 | 0.69 | 1.35 | 0.54 | 0.005 | 0.011 | 0.75 | | | 0.03 | 0.19 | | | | | | | 0.0032 | F | 0.1 | 0.01 | <0.0001 | 11.5 | 25.5 | 12 | 2167.9 | 22 | 798 |

TABLE 5

| Example | No. | Chemical composition | | | | | | | | | | | | | | | | |
|---|---|---|---|---|---|---|---|---|---|---|---|---|---|---|---|---|---|---|
| | | C | Si | Mn | P | S | Cr | Ti | V | Nb | Mo | W | Ni | Cu | C | B | Mg | N |
| Invented example | 90 | 0.50 | 2.21 | 0.26 | 0.005 | 0.003 | 0.98 | | | | | | | | | | 0.0009 | 0.0043 |
| Invented example | 91 | 0.55 | 2.61 | 0.89 | 0.007 | 0.007 | 1.32 | 0.05 | 0.1 | | 0.1 | | | | | 0.0021 | 0.0007 | 0.0043 |
| Invented example | 92 | 0.57 | 1.52 | 0.41 | 0.008 | 0.006 | 1.24 | | | | | 0.1 | | | | | 0.0011 | 0.0045 |
| Invented example | 93 | 0.62 | 1.73 | 1.19 | 0.004 | 0.010 | 1.34 | | | | 0.2 | | | | | | 0.0006 | 0.0028 |
| Invented example | 94 | 0.64 | 1.84 | 0.13 | 0.004 | 0.008 | 0.35 | | 0.2 | | 0.2 | | | | | | 0.0012 | 0.0032 |
| Invented example | 95 | 0.53 | 1.85 | 0.28 | 0.004 | 0.005 | 0.93 | | | | | | 0.5 | | | | 0.0008 | 0.0032 |
| Invented example | 96 | 0.52 | 1.83 | 1.16 | 0.008 | 0.009 | 1.37 | | 0.3 | | | | | | | | 0.0007 | 0.0028 |
| Comparative example | 97 | 0.63 | 1.49 | 0.71 | 0.011 | 0.004 | 1.39 | | 0.52 | 0.21 | | | | | | | | 0.036 |
| Comparative example | 98 | 0.50 | 2.68 | 0.65 | 0.009 | 0.009 | 0.61 | 0.05 | 0.4 | 0.06 | 0.2 | | | | | | | 0.034 |
| Comparative example | 99 | 0.51 | 2.13 | 0.91 | 0.007 | 0.004 | 0.88 | | | | | | | | | | | 0.043 |
| Comparative example | 100 | 0.58 | 1.77 | 0.50 | 0.012 | 0.004 | 1.35 | | | | | | | | | | | 0.035 |
| Comparative example | 101 | 0.59 | 1.24 | 0.46 | 0.003 | 0.004 | 0.20 | | | | | | | | | | | 0.023 |
| Comparative example | 102 | 0.53 | 1.90 | 0.38 | 0.007 | 0.011 | 0.77 | | | | | | | | | | | 0.024 |
| Comparative example | 103 | 0.51 | 2.65 | 0.31 | 0.005 | 0.006 | 0.51 | | | | | | | | | | | 0.0038 |

| Example | No. | Heat treatment method | Area percentage % | Density | | Max. carbide grain size μm | Max. oxide grain size μm | Prior austenite grain size number | Tensile strength MPa | Reduction of area % | Fatigue strength at Ono's test MPa | Delayed fracture strength MPa |
|---|---|---|---|---|---|---|---|---|---|---|---|---|
| | | | | 0.2–3 | >3 | | | | | | | |
| Invented example | 90 | OT | 1.4 | 0.28 | <0.0001 | 12.0 | 10.1 | 12 | 1951 | 44 | 945 | 1025 |
| Invented example | 91 | OT | 0.6 | 0.60 | <0.0001 | 10.6 | 11.8 | 12 | 1999 | 50 | 932 | 1030 |
| Invented example | 92 | OT | 4.9 | 0.50 | <0.0001 | 11.4 | 10.8 | 13 | 1958 | 40 | 968 | 1071 |
| Invented example | 93 | OT | 4.1 | 0.53 | <0.0001 | 12.0 | 12.5 | 10 | 1949 | 41 | 946 | 915 |
| Invented example | 94 | OT | 0.6 | 0.19 | <0.0001 | 10.6 | 13.0 | 13 | 2004 | 49 | 940 | 1036 |
| Invented example | 95 | OT | 3.0 | 0.03 | <0.0001 | 10.8 | 11.8 | 10 | 1952 | 44 | 880 | 919 |
| Invented example | 96 | OT | 1.4 | 0.54 | <0.0001 | 10.9 | 11.1 | 11 | 1962 | 41 | 968 | 959 |
| Comparative example | 97 | OT | 8.5 | 0.27 | <0.0001 | 11.9 | 10.7 | 12 | 2019 | 32 | 967 | 980 |
| Comparative example | 98 | OT | 1.2 | 1.37 | <0.0001 | 11.2 | 12.4 | 11 | 1986 | 33 | 942 | 966 |
| Comparative example | 99 | OT | 1.0 | 0.08 | <0.0001 | 12.3 | 11.6 | 12 | 1971 | 50 | 890 | 872 |
| Comparative example | 100 | F | 0.7 | 0.56 | <0.0001 | 12.3 | 13.0 | 8 | 1985 | 32 | 881 | 859 |
| Comparative example | 101 | OT | 0.8 | 0.07 | <0.0001 | 11.6 | 12.2 | 10 | 1812 | 48 | 851 | 873 |
| Comparative example | 102 | OT | 0.9 | 0.26 | <0.0001 | 22.2 | 12.2 | 11 | 1979 | 31 | 882 | 873 |
| Comparative example | 103 | OT | 0.3 | 0.23 | <0.0001 | 12.4 | 31.3 | 11 | 1980 | 48 | 843 | 921 |

Example 4

Tables 6 and 7 show examples according to the present invention and comparative examples: Table 6 shows the chemical compositions of steels and Table 7 their properties. The examples according to the present invention and comparative examples were prepared by the same methods as in Example 1.

The evaluation of the rolling defects and the properties after the post-rolling quenching and tempering was also done in the same manner as in Example 1.

After being drawn to a diameter of 4 mm, the steel wires were quenched and tempered through a so-called oil quenching and tempering treatment, wherein they were quenched by being heated in a radiation furnace and, immediately thereafter, cooled in an oil bath and then tempered by being heated in a molten Pb bath.

In the oil quenching and tempering treatment, the drawn wires were made to pass through a heating furnace continuously, and the residence time in the heating furnace was controlled so that the wires were well heated to the center portion. If the heating is insufficient, hardening becomes insufficient, and a sufficient strength cannot be achieved. In this example, the heating temperature was set at 950° C., the heating time at 150 sec. and the quenching temperature (oil bath temperature) at 50° C. Then, the strength of the wires was controlled through the tempering at a tempering temperature of 400 to 550° C. and a tempering time of 1 min. The heating temperature for the quenching and tempering and the tensile strength in the normal atmosphere obtained through the treatment were as shown in Table 7. The tensile strength was controlled to 2,150 to 2,250 MPa or so.

The globular carbides in the steels of the examples including cementite, which is considered to be of importance in the present invention, are also shown in the table. The size and number of the carbides were evaluated in the same manner as in Example 1.

The ductility of the samples was evaluated through the notch bending test shown in FIG. 4.

It is a common practice with high-strength springs to apply nitriding, after the formation into the shape of springs, for hardening the surface and enhancing durability. In this relation, steel wires having tensile strengths controlled to 2,150 to 2,250 MPa were subjected to a nitriding treatment for the purpose of examining their nitriding characteristics. Here, the so-called soft gas nitriding treatment was applied under the following conditions: a nitriding temperature of 520° C., a holding time of 3 h., a mixed atmosphere gas of $N_2$ 45%+$NH_3$ 50%+$CO_2$ 5%, and a gas flow rate of 1 $m^3$/h. (at atmospheric pressure).

After the nitriding treatment, sectional planes of the steel wires were polished in a mirror finish and the hardness was measured at the outermost layer (25 μm from the outer surface) and an internal portion (0.5 mm from the outer surface) using a micro Vickers hardness tester (0.49 N). While the surface layer is hardened through nitriding, the inside tends to soften by the heating during nitriding. It is important for a spring steel that the surface layer is sufficiently hardened and the softening of the internal portion is minimized.

In the invented examples, the number and size of globular carbides after rolling were small, rolling defects were prevented from occurring and a high strength and a good notch bending property were realized after the quenching and tempering. It is seen from the table that comparative examples, in contrast, were inferior in the notch bending property and the coiling property. Further, rolling defects were found in them, witnessing a difficulty in rolling the operation.

[Tables 6 and 7]

TABLE 6

| Example | No. | C | Si | Mn | P | S | Cr | W | Ti | V | Mo | Nb | Mg | N |
|---|---|---|---|---|---|---|---|---|---|---|---|---|---|---|
| Invented example | 104 | 0.89 | 1.71 | 0.77 | 0.010 | 0.005 | 0.79 | 0.10 | | | | | — | 0.0029 |
| | 105 | 0.85 | 1.89 | 0.83 | 0.009 | 0.006 | 0.65 | 0.19 | | | | | — | 0.0046 |
| | 106 | 0.82 | 1.84 | 0.88 | 0.007 | 0.011 | 0.78 | 0.28 | 0.008 | | | | 0.0010 | 0.0035 |
| | 107 | 0.89 | 1.79 | 1.08 | 0.012 | 0.013 | 0.80 | 0.22 | | 0.014 | | | 0.0009 | 0.0030 |
| | 108 | 0.81 | 1.76 | 1.10 | 0.005 | 0.007 | 0.95 | 0.19 | | | | | 0.0010 | 0.0044 |
| | 109 | 0.83 | 1.82 | 0.88 | 0.014 | 0.004 | 0.92 | 0.30 | | | 0.15 | | 0.0004 | 0.0041 |
| | 110 | 0.87 | 1.68 | 0.74 | 0.009 | 0.011 | 0.75 | 0.28 | | | | 0.02 | 0.0008 | 0.0042 |
| | 111 | 0.81 | 1.80 | 0.71 | 0.009 | 0.013 | 0.72 | 0.29 | | | | | 0.0009 | 0.0033 |
| | 112 | 0.88 | 1.87 | 1.06 | 0.013 | 0.008 | 0.88 | 0.21 | | | | | 0.0008 | 0.0041 |
| | 113 | 0.90 | 1.86 | 0.78 | 0.006 | 0.008 | 0.96 | 0.07 | | | | | — | 0.0038 |
| | 114 | 0.86 | 1.84 | 0.71 | 0.005 | 0.012 | 0.80 | 0.16 | 0.007 | | | | — | 0.0045 |
| | 115 | 0.82 | 2.03 | 0.32 | 0.004 | 0.013 | 0.68 | 0.14 | | 0.07 | | | — | 0.0033 |
| | 116 | 0.87 | 2.22 | 0.84 | 0.010 | 0.008 | 0.52 | 0.18 | | | | | 0.0009 | 0.0034 |
| | 117 | 0.88 | 2.00 | 1.04 | 0.007 | 0.013 | 0.82 | 0.18 | | | | | 0.0008 | 0.0045 |
| | 118 | 0.78 | 1.46 | 0.84 | 0.011 | 0.004 | 0.79 | 0.12 | | | | | 0.0011 | 0.0031 |
| | 119 | 0.84 | 1.50 | 0.71 | 0.009 | 0.005 | 0.95 | 0.29 | | 0.25 | 0.40 | | — | 0.0046 |
| | 120 | 0.87 | 2.35 | 0.93 | 0.015 | 0.011 | 0.68 | 0.09 | | 0.15 | | | — | 0.0048 |
| | 121 | 0.86 | 2.38 | 0.40 | 0.010 | 0.010 | 0.52 | 0.06 | | 0.45 | | | 0.0008 | 0.0048 |
| | 122 | 0.81 | 2.07 | 0.30 | 0.008 | 0.013 | 0.84 | 0.29 | | 0.30 | 0.24 | | 0.0010 | 0.0028 |
| | 123 | 0.85 | 2.22 | 0.71 | 0.006 | 0.004 | 0.62 | 0.25 | | 0.10 | 0.17 | | 0.0005 | 0.0044 |
| | 124 | 1.06 | 1.68 | 0.35 | 0.014 | 0.010 | 0.55 | 0.18 | | | | | 0.0007 | 0.0037 |
| Comparative example | 125 | 0.85 | 1.79 | 1.12 | 0.012 | 0.008 | 1.56 | — | | 0.29 | 0.25 | | | 0.0032 |
| | 126 | 0.75 | 1.54 | 0.76 | 0.008 | 0.007 | 0.80 | — | | 0.38 | 0.35 | 0.06 | | 0.0035 |
| | 127 | 0.68 | 2.25 | 1.03 | 0.010 | 0.014 | 0.45 | — | | 0.11 | 0.23 | 0.08 | | 0.0036 |
| | 128 | 0.79 | 1.86 | 0.25 | 0.006 | 0.012 | 0.96 | 0.14 | 0.08 | 0.38 | 0.28 | | | 0.0033 |
| | 129 | 0.70 | 2.10 | 1.07 | 0.012 | 0.004 | 1.81 | 0.12 | | 0.41 | 0.12 | | | 0.0045 |
| | 130 | 1.45 | 2.15 | 0.25 | 0.012 | 0.009 | 1.00 | 0.16 | | 0.40 | 0.36 | | | 0.0045 |
| | 131 | 0.95 | 2.12 | 0.96 | 0.004 | 0.007 | 0.91 | 1.10 | | 0.53 | 0.31 | | | 0.0042 |
| | 132 | 0.82 | 2.01 | 0.99 | 0.010 | 0.008 | 0.15 | 0.11 | | 0.12 | | | | 0.0042 |

TABLE 7

| | No. | Density (after rolling) 0.2-3 μm | >3 μm | Rolling defects | Density (after OT) 0.2-3 μm | >3 μm | Tensile strength MPa | Notch bending angle (°) | Nitriding property (hardness HV) Surface layer | Internal portion |
|---|---|---|---|---|---|---|---|---|---|---|
| Invented example | 104 | 0.022 | 0.0014 | ○ | 0.08 | 0.0014 | 2158 | 36 | 726 | 519 |
| | 105 | 0.060 | 0.0015 | ○ | 0.16 | 0.0011 | 2262 | 34 | 765 | 539 |
| | 106 | 0.005 | 0.0020 | ○ | 0.02 | 0.0008 | 2226 | 35 | 728 | 526 |
| | 107 | 0.043 | 0.0005 | ○ | 0.13 | 0.0008 | 2209 | 36 | 759 | 495 |
| | 108 | 0.045 | 0.0007 | ○ | 0.18 | 0.0016 | 2154 | 36 | 744 | 534 |
| | 109 | 0.040 | 0.0012 | ○ | 0.10 | 0.0014 | 2234 | 38 | 768 | 534 |
| | 110 | 0.015 | 0.0005 | ○ | 0.06 | 0.0016 | 2177 | 36 | 764 | 542 |
| | 111 | 0.057 | 0.0018 | ○ | 0.15 | 0.0014 | 2151 | 31 | 730 | 493 |
| | 112 | 0.018 | 0.0009 | ○ | 0.06 | 0.0008 | 2153 | 31 | 770 | 508 |
| | 113 | 0.053 | 0.0013 | ○ | 0.19 | 0.0018 | 2175 | 37 | 748 | 523 |
| | 114 | 0.015 | 0.0013 | ○ | 0.06 | 0.0007 | 2178 | 36 | 734 | 505 |
| | 115 | 0.192 | 0.0017 | ○ | 0.33 | 0.0014 | 2231 | 36 | 740 | 523 |
| | 116 | 0.095 | 0.0008 | ○ | 0.25 | 0.0011 | 2160 | 37 | 729 | 522 |
| | 117 | 0.027 | 0.0008 | ○ | 0.08 | 0.0018 | 2207 | 40 | 731 | 521 |
| | 118 | 0.071 | 0.0015 | ○ | 0.25 | 0.0019 | 2219 | 38 | 764 | 504 |
| | 119 | 0.156 | 0.0010 | ○ | 0.28 | 0.0017 | 2214 | 35 | 727 | 496 |
| | 120 | 0.019 | 0.0012 | ○ | 0.09 | 0.0010 | 2225 | 38 | 723 | 547 |
| | 121 | 0.280 | 0.0012 | ○ | 0.33 | 0.0017 | 2182 | 39 | 735 | 504 |
| | 122 | 0.186 | 0.0012 | ○ | 0.34 | 0.0012 | 2150 | 34 | 724 | 505 |
| | 123 | 0.246 | 0.0010 | ○ | 0.77 | 0.0016 | 2241 | 39 | 744 | 507 |
| | 124 | 0.019 | 0.0017 | ○ | 0.06 | 0.0018 | 2163 | 40 | 742 | 530 |
| Comparative example | 125 | 0.468 | 0.0057 | × | | | | | | |
| | 126 | 0.405 | 0.0064 | ○ | 1.21 | 0.0070 | 2167 | 23 | 746 | 528 |
| | 127 | 0.594 | 0.0100 | ○ | 1.77 | 0.0110 | 2179 | 28 | 720 | 537 |
| | 128 | 0.005 | 0.0053 | ○ | 0.01 | 0.0058 | 2209 | 28 | 728 | 513 |
| | 129 | 0.064 | 0.0131 | × | | | | | | |
| | 130 | 0.546 | 0.0103 | × | | | | | | |
| | 131 | 0.738 | 0.0103 | ○ | 0.91 | 0.0113 | 2259 | 27 | 744 | 493 |
| | 132 | 0.006 | 0.0024 | ○ | 0.05 | 0.0019 | 2214 | 37 | 547 | 433 |

As for the influence on nitriding, as seen in comparative example 132 with a low content of Cr, the surface hardness after nitriding is lower than invented examples and, in addition, the internal portion was softer than invented examples owing to insufficient temper softening resistance. As the insufficient hardness in these portions is disadvantageous compared with invented examples in terms of durability and settling resistance, unlike the case of invented examples, nitriding does not bring about an improvement in spring performance in such steels.

INDUSTRIAL APPLICABILITY

The present invention makes it possible to obtain a steel and a steel wire for springs having a high strength and a high toughness by adjusting a steel chemical composition so as to be able to control the precipitation of carbides including cementite in the steel. The present invention also makes it possible to produce a spring having a high strength after heat treatment. When applied, in particular, to the springs manufactured by the cold coiling method, too, the present invention makes it possible to produce a high-strength spring excellent in fracture property by increasing the strength to 1,900 MPa or more and securing a good coiling property.

The invention claimed is:

1. A spring steel wire having a high strength and toughness after heat treatment suitable for use in springs for cars, characterized by: the spring steel wire consisting essentially of, in mass, C: 0.4-1.2%, Si: 0.9-3.0%, Mn: 1-2.0%, P≦0.015%, S: <0.015%, Cr 1.07-2.5%, N: 0.001-0.015%, Mg: 0.0004-0.01%, W: 0.05-1.0% with a balance of Fe and unavoidable impurities; and wherein steel for spring steel wire has been subjected to heating at 1200° C. or more for an effective amount of time to dissolve coarse carbide in the steel followed by hot rolling; and wherein globular cementite carbides observed in a microscopic visual field satisfy the density of globular cementite carbides of 0.2 to 3 μm in circle-equivalent diameter is 0.5 piece/μm$^2$ or less and the density of globular cementite carbides of over 3 μm in circle-equivalent diameter is 0.005 piece/μm$^2$ or less.

* * * * *